United States Patent
Sugiyama

(10) Patent No.: US 7,447,389 B2
(45) Date of Patent: Nov. 4, 2008

(54) OPTICAL MODULATOR

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/653,227

(22) Filed: Jan. 16, 2007

(65) Prior Publication Data

US 2008/0031564 A1    Feb. 7, 2008

(30) Foreign Application Priority Data

Aug. 1, 2006    (JP)    ............... 2006-210309

(51) Int. Cl.
*G02B 6/26* (2006.01)
*G02B 6/42* (2006.01)
*G02F 1/295* (2006.01)

(52) U.S. Cl. ............... 385/9; 385/3; 385/4; 385/8; 385/39; 385/40; 385/45

(58) Field of Classification Search ............ 385/2–3, 385/40, 4, 8, 9, 39, 45
See application file for complete search history.

(56) References Cited

U.S. PATENT DOCUMENTS 4,502,037 A  *  2/1985  Le Parquier et al. ........ 341/111

5,764,822 A      6/1998  Madabhushi
6,522,792 B1    2/2003  Sugamata et al.
2003/0147576 A1    8/2003  Doi et al.
2004/0008943 A1 *  1/2004  Berini ............... 385/39

FOREIGN PATENT DOCUMENTS

| JP | 9-197358 | 7/1997 |
| JP | 10-142568 | 5/1998 |
| JP | 10-274758 | 10/1998 |
| JP | 2000-122016 | 4/2000 |
| JP | 2003-233042 | 8/2003 |

* cited by examiner

Primary Examiner—Frank G Font
Assistant Examiner—Michael P Mooney
(74) Attorney, Agent, or Firm—Staas & Halsey LLP

(57) ABSTRACT

An optical modulator includes a signal electrode for application of modulation signals whereby light propagated over an optical waveguide is modulated, and bias electrodes for application of a bias voltage for controlling an operating point for the modulation signals. A buffer layer is provided between a substrate exhibiting electro-optical effect and the bias electrodes, but at regions where no optical waveguide is formed beneath the bias electrodes, no buffer layer is provided, and the bias electrodes are provided directly upon the substrate. This configuration enables bias voltage to be reduced.

13 Claims, 20 Drawing Sheets

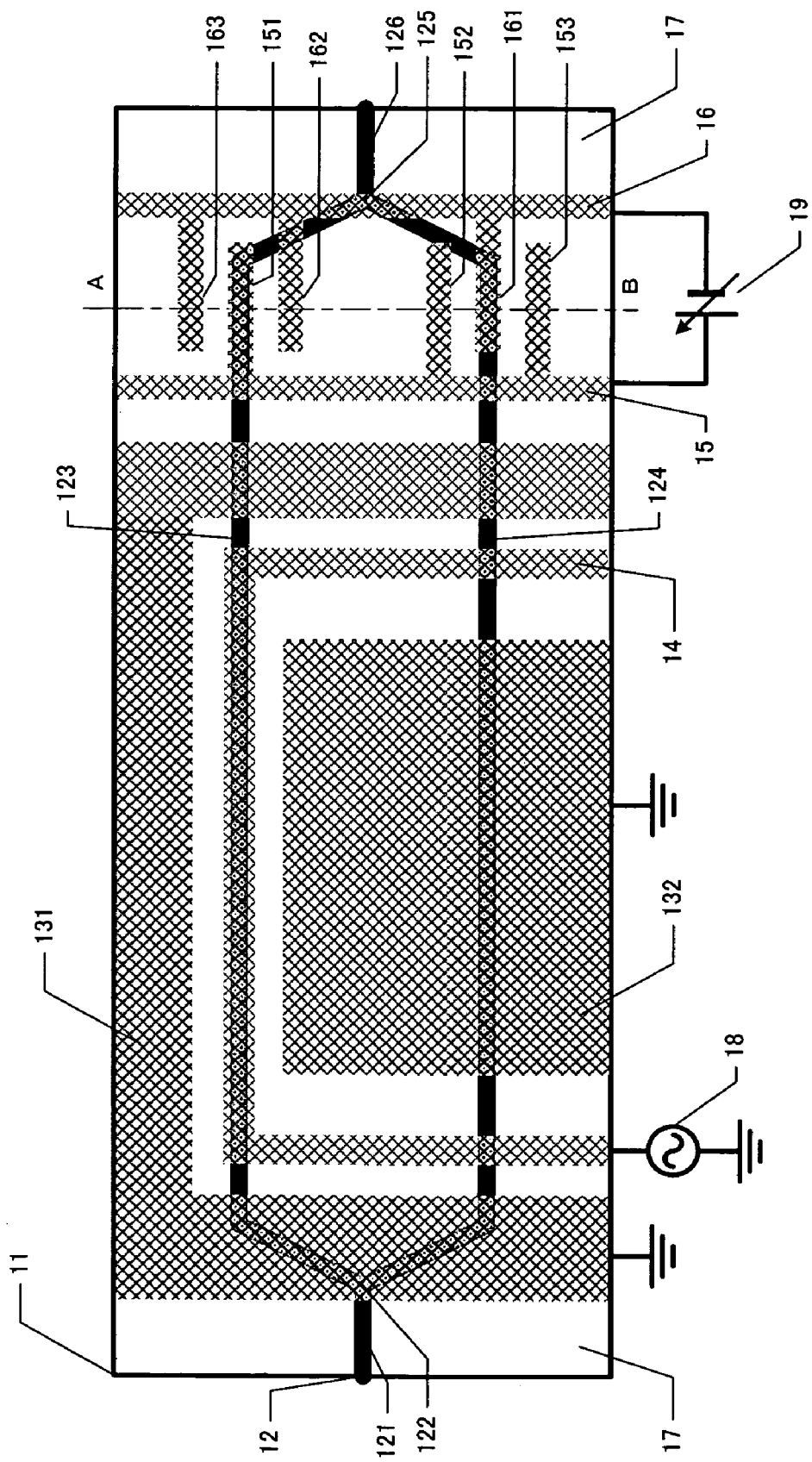

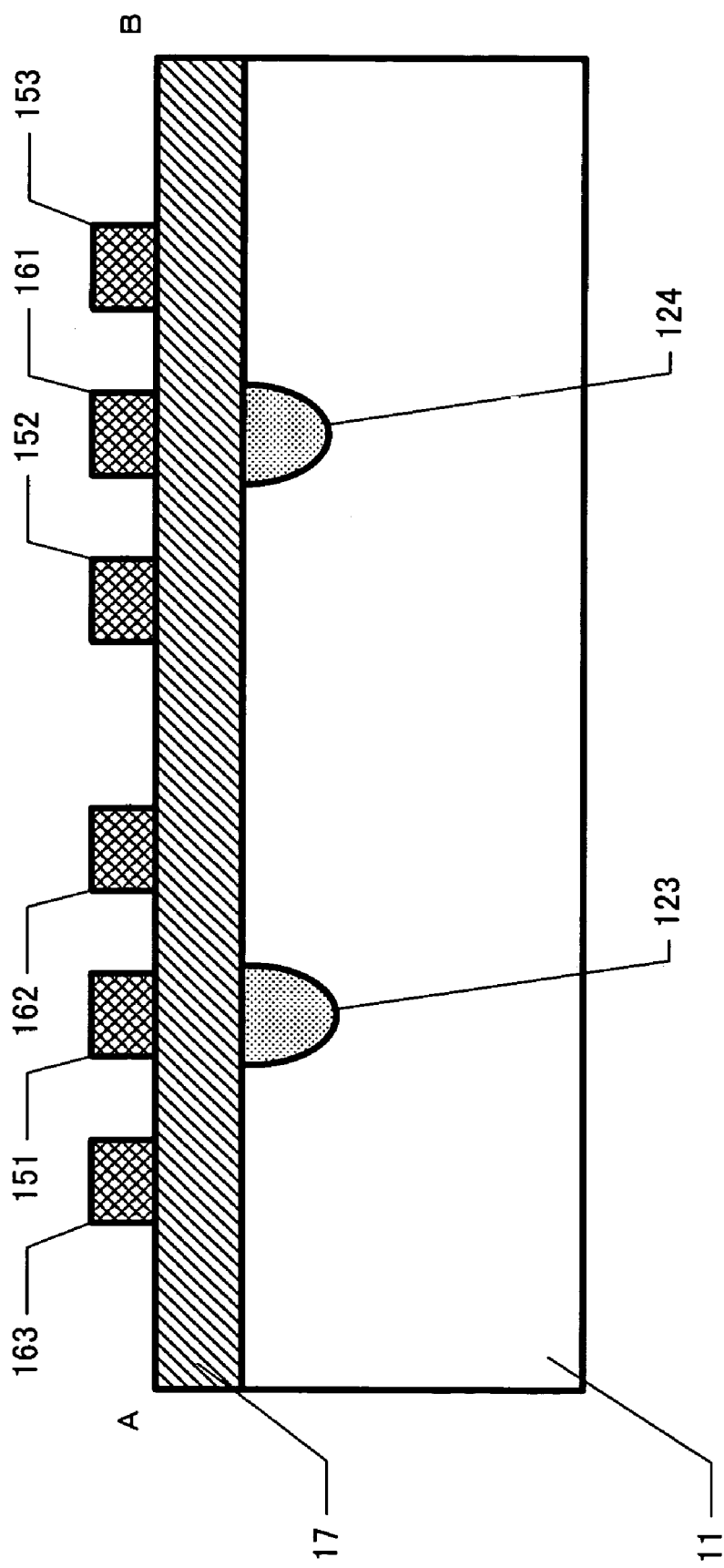

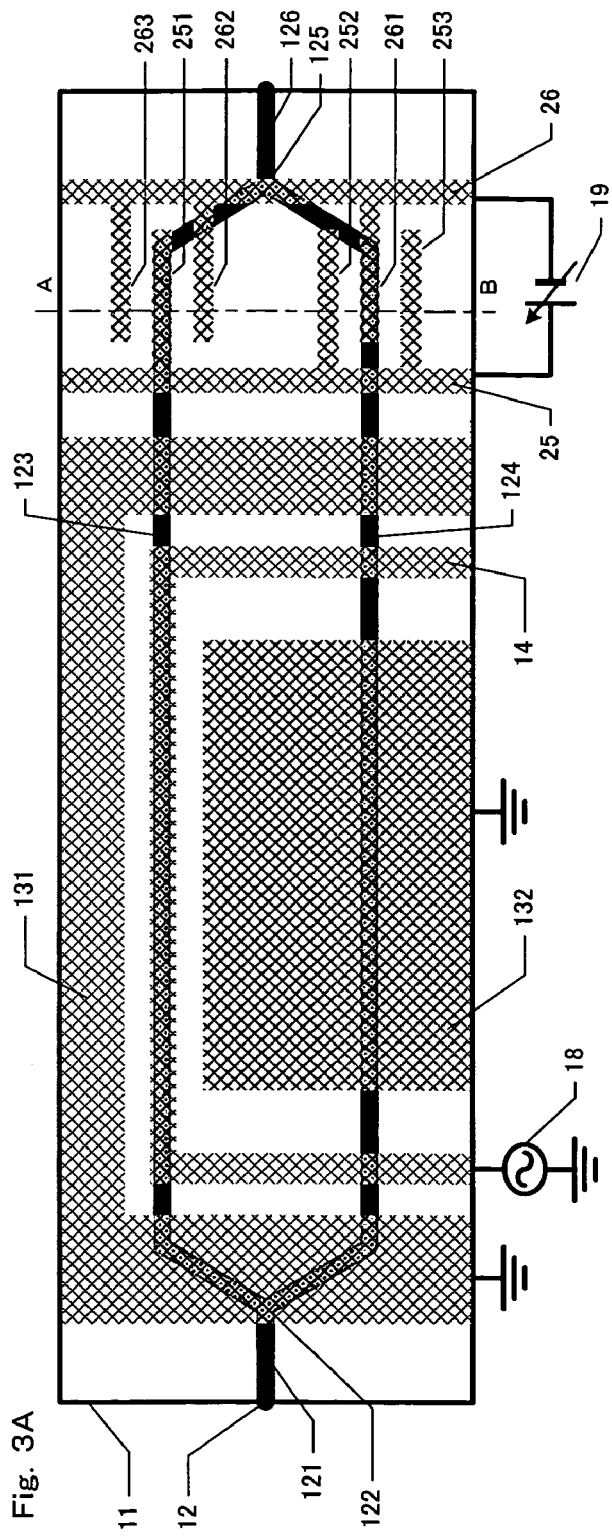
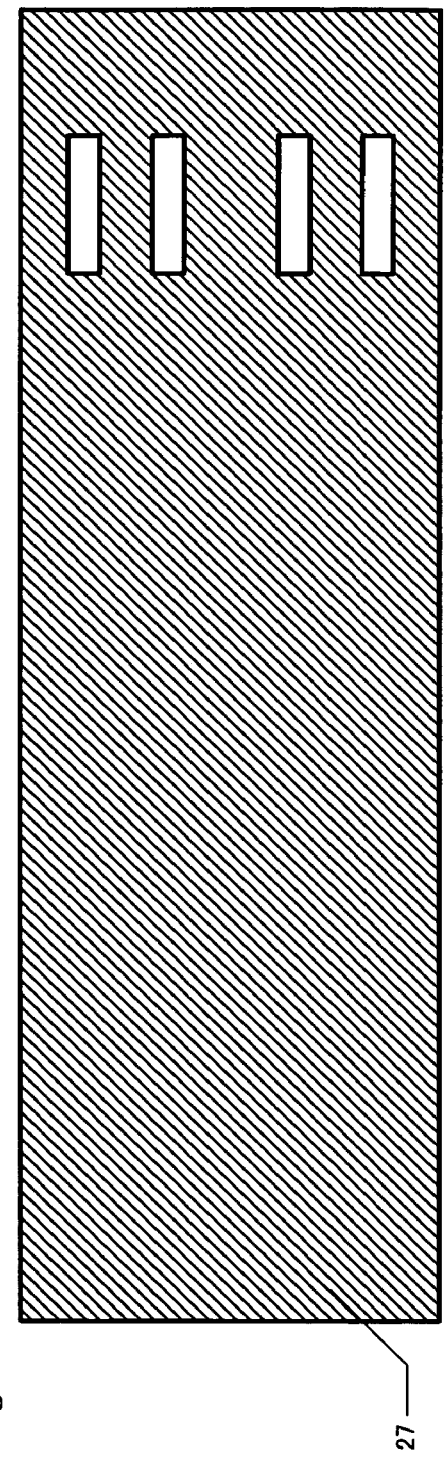
Fig. 3A
Fig. 3B

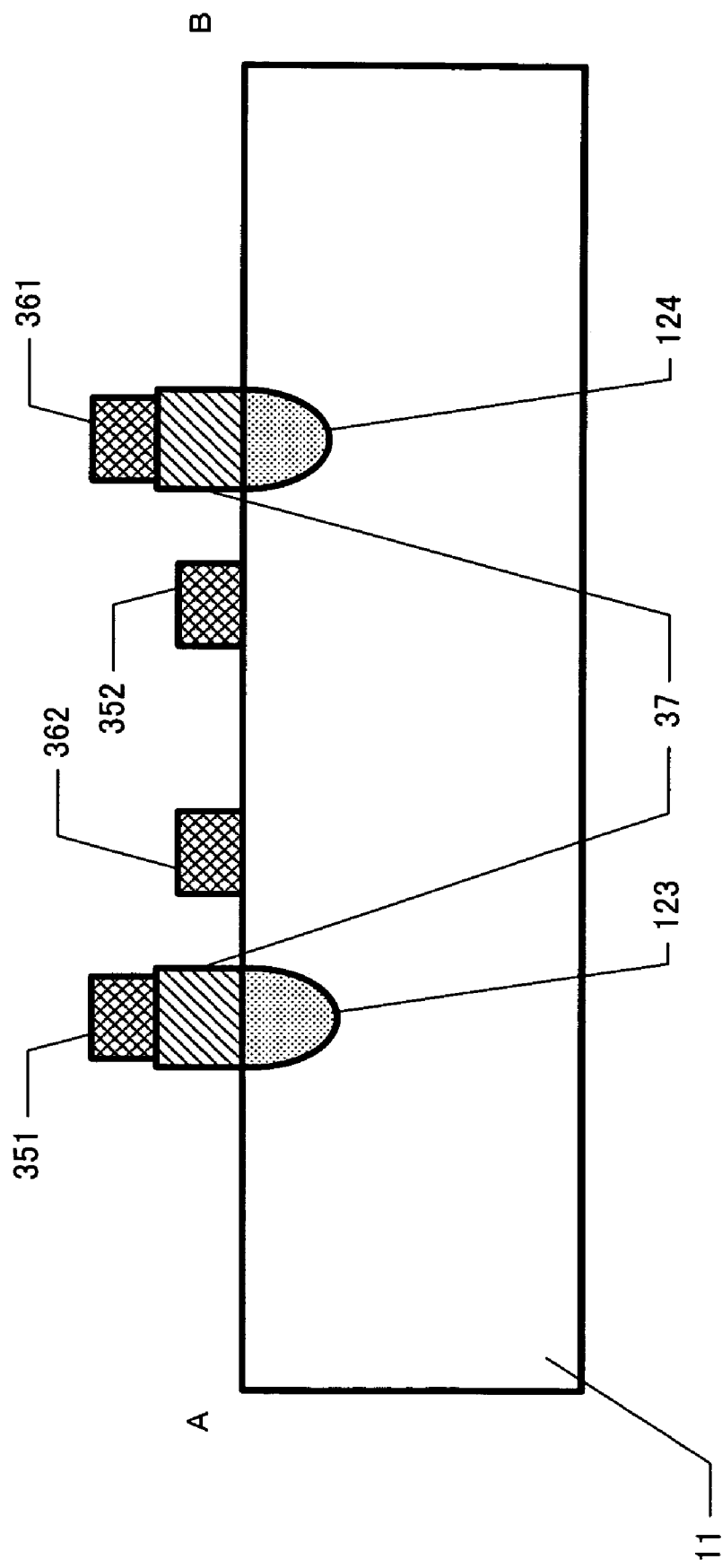

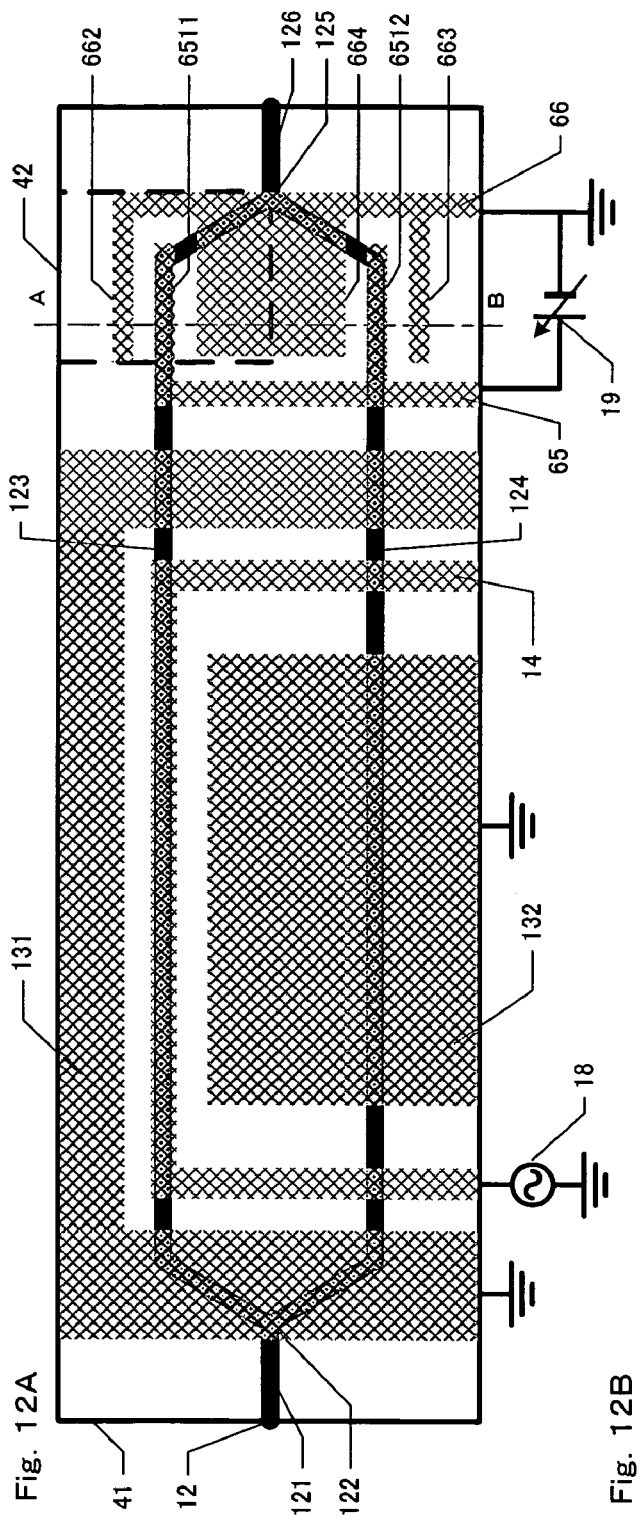
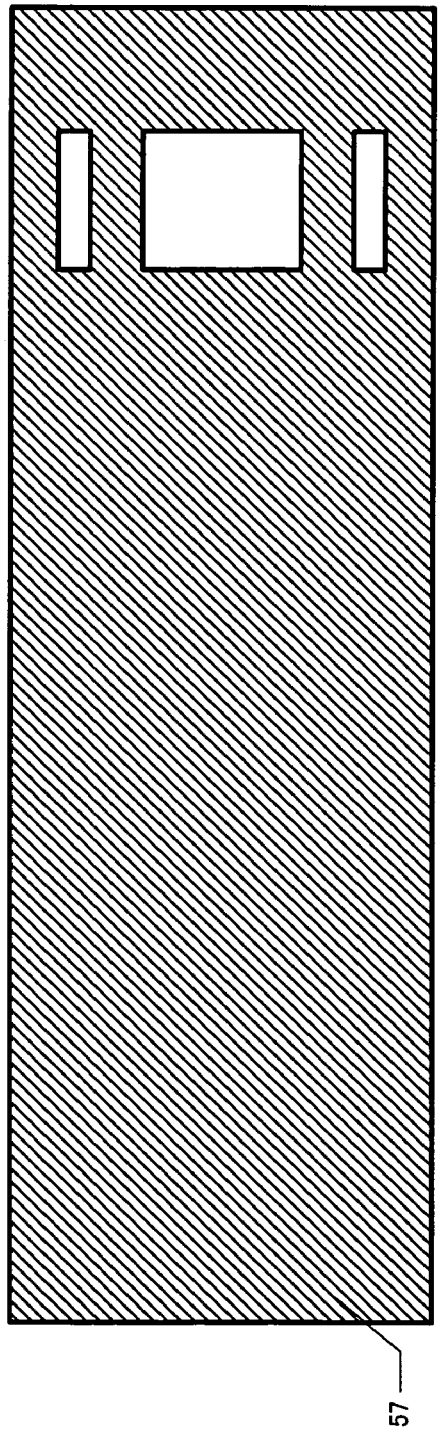
Fig. 12A
Fig. 12B

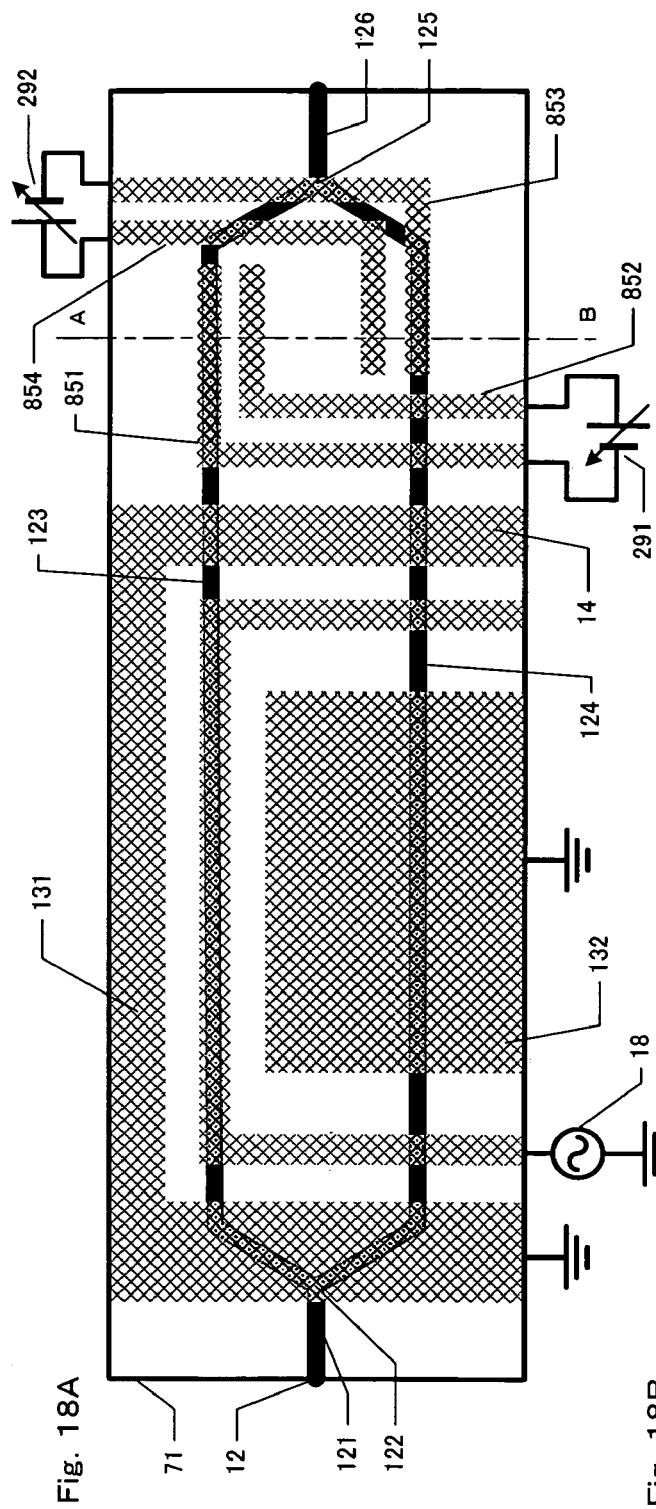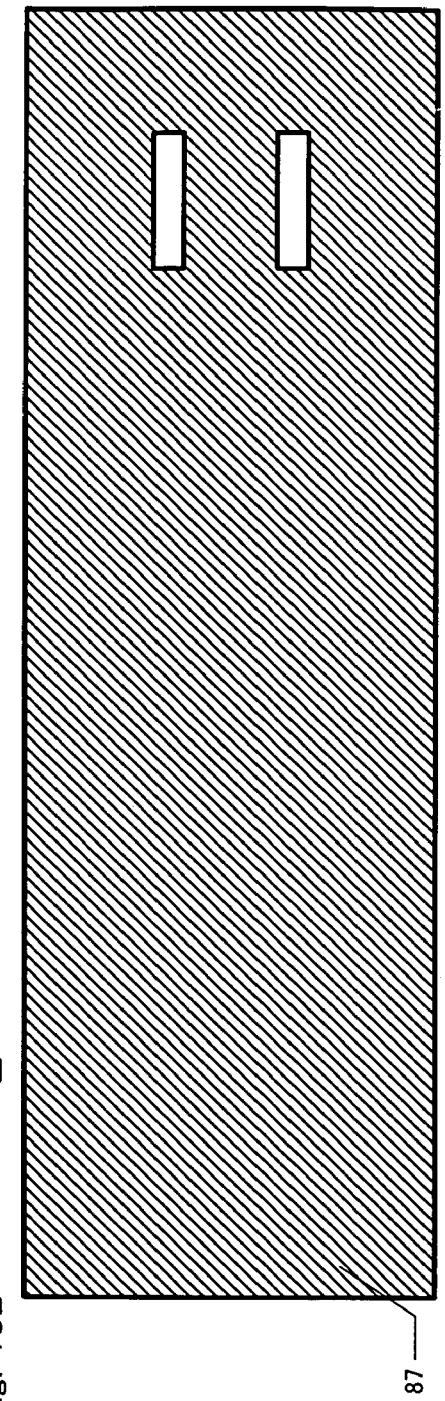
Fig. 18A
Fig. 18B

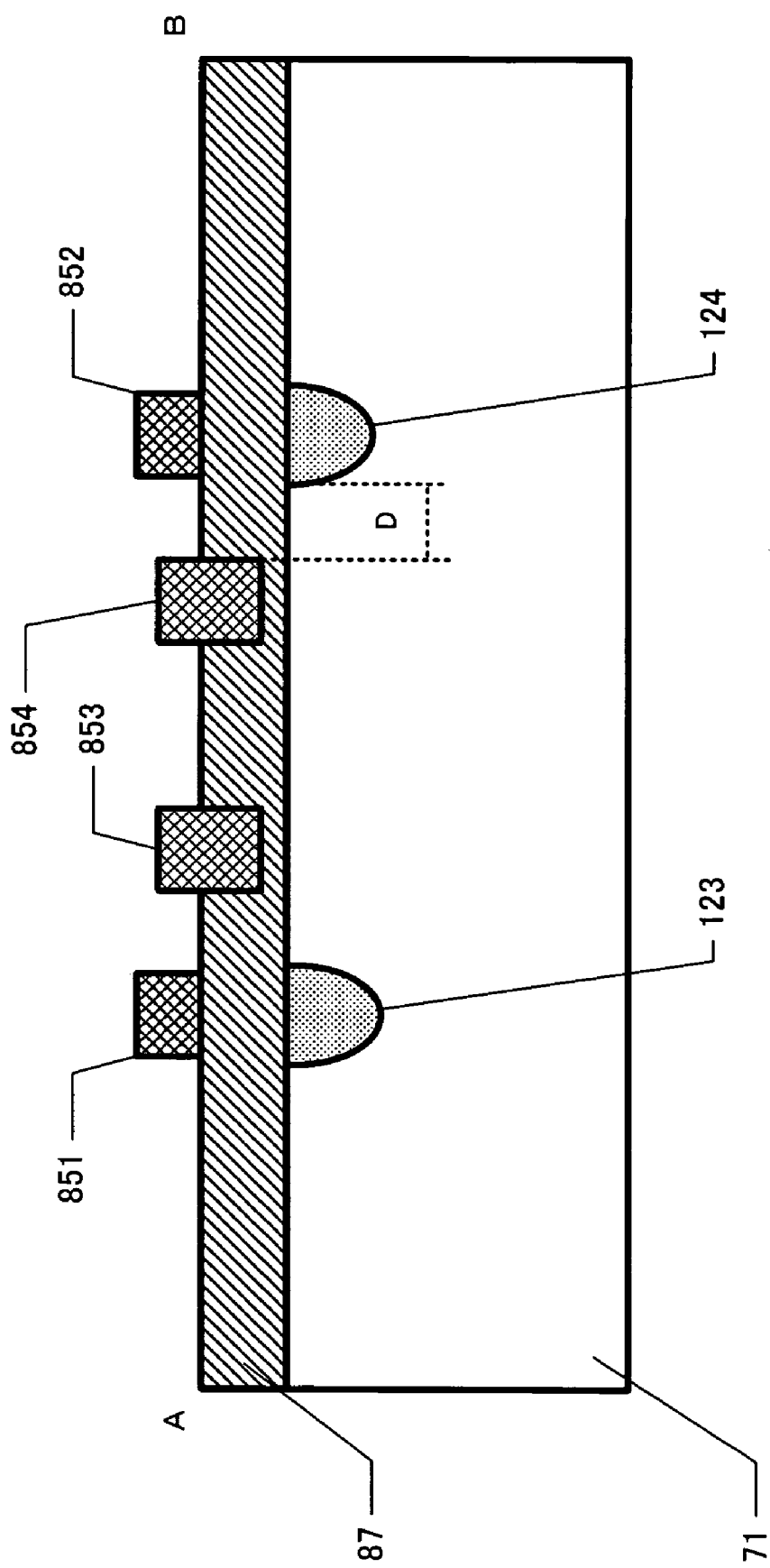

OPTICAL MODULATOR

BACKGROUND OF THE INVENTION

1. Field of the Invention

The present invention relates to an optical modulator used in an optical communication system, wherein data signals are converted from electric signals into optical signals by controlling optical phase with electro-optical effect.

2. Description of the Related Art

In recent years, progress is being made in various fields regarding optical communication systems to realize increased speed, increased capacity, and reduction in size. With optical transmission devices, optical waveguide type external modulators using electro-optical crystals such as lithium neonate ($LiNbO_3$, hereafter may be written simply as "LN") substrates and the like instead of performing direct modulation with a laser diode, from the perspective of broadband properties, chirp properties, and so forth.

With such modulators, a Mach-Zehnder type topical waveguide is formed on an electro-optical crystal substrate formed of LN or the like, by forming a metal film of titanium (Ti) or the like on a part of a crystal substrate of LN or the like and then effecting thermal dispersion thereof, or forming the metal film and effecting proton exchange in benzoic acid. A buffer layer of silicon dioxide ($SiO_2$) is formed on the substrate wherein the optical waveguide has been formed. Further, in the case of a substrate cut parallel to the Z-axis of the crystal axis direction of the LN substrate, an LN modulator is fabricated by providing two signal electrodes (one positive signal electrode and one negative signal electrode), or a one signal electrode and one ground electrode, on a linear portion of a Mach-Zehnder optical waveguide. This buffer layer is provided for reducing absorption loss with regard to light propagated over the optical waveguide. An RF (Radio Frequency) signal source for generating modulation signals is connected to the signal electrode(s).

There are also known an optical modulator wherein an operation point for RF signals applied to the signal electrode, i.e., a bias electrode for applying bias voltage for controlling the DC bias component of the RF signals, is provided, with the bias electrode being provided on a linear portion other than the linear portion of the Mach-Zehnder optical waveguide where the signal electrode(s) is (are) provided. This optical modulator is disclosed in Japanese Unexamined Patent Application Publication No. 2003-233042.

There is also known an optical modulator wherein an X-cut substrate is used and a buffer layer having a width greater than the width of the signal electrode(s) is embedded in the surface portion of the X-cut substrate only underneath the signal electrode(s). This optical modulator is disclosed in Japanese Unexamined Patent Application Publication No. 2000-122016.

There is also known an optical modulator using a Z-cut substrate, wherein a polarization inversion region is formed on a part of the linear portion of a Mach-Zehnder optical waveguide, and RF signals of the same polarity are applied to signal electrodes at two linear portions of the Mach-Zehnder optical waveguide, thereby suppressing chirp. This optical modulator is disclosed in Japanese Unexamined Patent Application Publication No. 2003-202530.

With the buffer layer below the signals electrode(s) in the optical modulators described above, a thick buffer layer will result in a broader modulation bandwidth but higher modulation voltage, while a thin buffer layer will result in lower modulation voltage but a narrower modulation bandwidth. However, the bias voltage applied to the optical waveguide beneath the bias electrode across the buffer layer is not dependent on the thickness of the buffer layer.

SUMMARY OF THE INVENTION

As described above, with optical modulators having a signal electrode and bias electrode, the thickness of a buffer layer provided between the bias electrode and the substrate exhibiting electro-optical effect affects the bias voltage, and accordingly, it is an object of the present invention to provide an optical modulator enabling voltage reduction of the bias voltage.

According to one aspect of the present invention, an optical modulator comprising: a substrate for having an electro-optical effect; an interference-type optical waveguide formed on the substrate, wherein mutual interference of light propagated over a pair of optical waveguides occurs; electrodes to which electric signals for the electro-optical effect are applied; and a buffer layer formed between the substrate and the electrodes on the substrate; wherein the electrodes comprise a signal electrode to which modulation signals, for modulating light propagated over the optical waveguides, are applied, and bias electrodes to which bias signals, for controlling an operation point for the modulation signals, are applied; and wherein the bias electrodes comprise a first bias electrode to which a first electric potential is provided, and a second bias electrode to which a second electric potential is provided, wherein the first bias electrode comprises an over-waveguide electrode piece formed over one of the optical waveguides, and at least one potential-setting electrode piece formed near the other optical waveguide, and wherein the second bias electrode comprises an over-waveguide electrode piece formed over the other optical waveguide, and at least one potential-setting electrode piece formed near the one of optical waveguides; and wherein the potential-setting electrode pieces are provided on the substrate without the buffer layer being introduced between the potential-setting electrode pieces and the substrate.

According to such a configuration, an optical modulator can be provided which uses a substrate having a signal electrode and bias electrodes with a buffer layer provided between bias electrodes disposed over optical waveguides and the substrate, but the buffer layer is not provided at regions where there is no optical waveguide under a bias electrode.

With the optical modulator according to the present invention, with regard to the buffer layer provided between the substrate having electro-optical effect and the bias electrodes, no buffer layer is provided in cases where there is no optical waveguide on the substrate under a bias electrode, and the buffer layer is provided only in cases where there is an optical waveguide on the substrate under a bias electrode. Accordingly, the effects of the buffer layer with regard to the intensity of the electric field applied to the optical waveguide can be reduced, thereby enabling reduction in the bias voltage applied to the bias electrode.

BRIEF DESCRIPTION OF THE DRAWINGS

FIG. 1 is a diagram for describing an optical modulator having a signal electrode and bias electrodes;

FIG. 2 is a cross-sectional view of a bias electrode region of the optical modulator shown in FIG. 1;

FIGS. 3A and 3B are diagrams for describing an optical modulator according to the present invention;

FIG. 8 is a cross-sectional view of a bias electrode region of the optical modulator shown in FIGS. 7A and 7B;

FIGS. 12A and 12B are diagrams for describing an optical modulator according to the present invention;

FIGS. 18A and 18B are diagrams for describing an optical modulator-according to the present invention;

FIG. 20 is a cross-sectional view of a bias electrode region of the optical modulator shown in FIGS. 18A and 18B.

DESCRIPTION OF THE PREFERRED EMBODIMENTS

Figure 4:
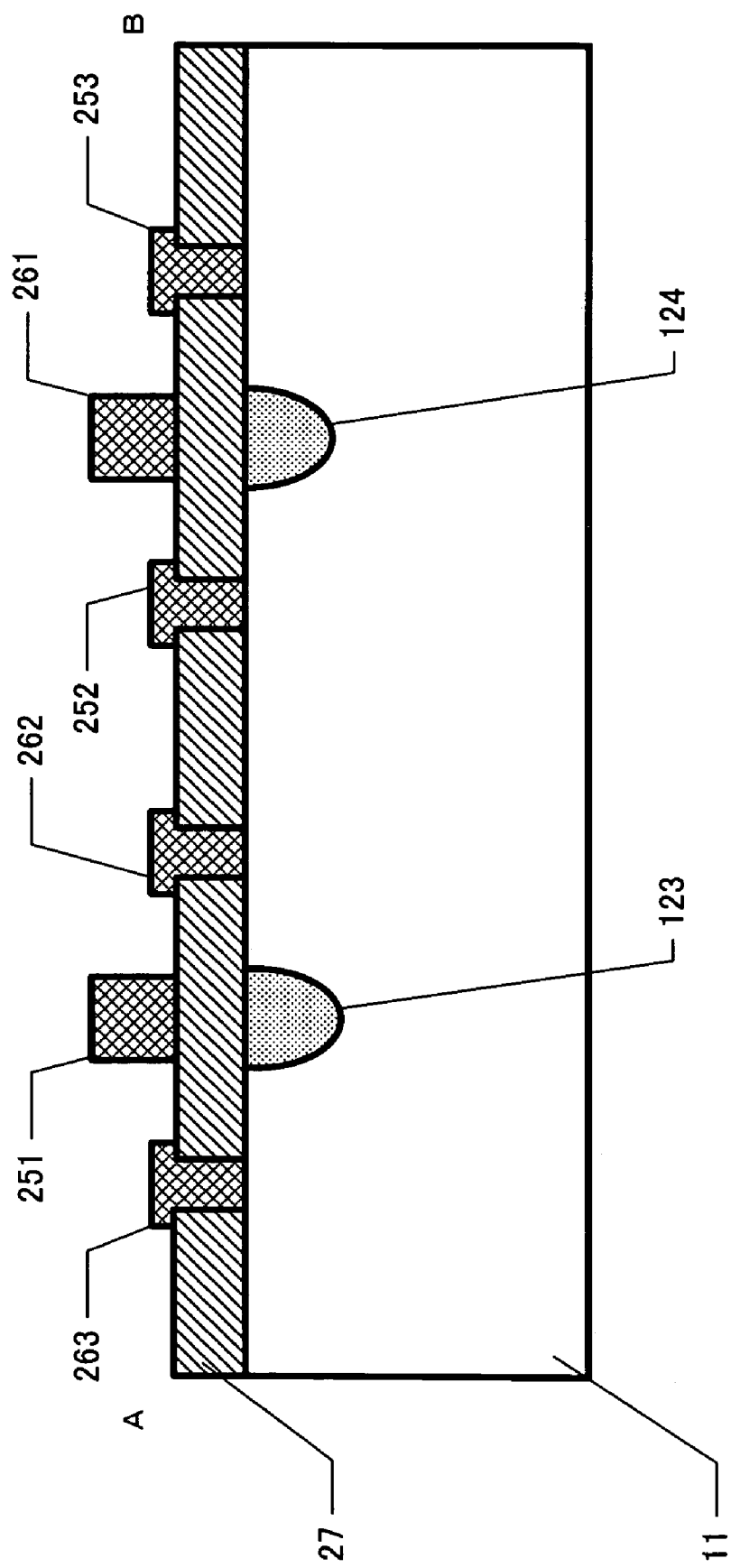
FIG. 4 is a cross-sectional view of a bias electrode region of the optical modulator shown in FIGS. 3A and 3B.

Details of the present invention will be described with reference to the drawings. Note that identical or equivalent components in the drawings will be denoted by the same reference numerals.

FIG. 1 is a diagram for describing an optical modulator having a signal electrode and bias electrodes. An optical waveguide 12 is formed on a substrate 11 formed of LN for example, cut parallel to the Z-axis of the crystal axis direction, i.e., a Z-cut substrate, by thermal dispersion of a metal film such as Ti or the like. The Z-cut substrate 11 has a crystal axis whereby the refractive index can be effectively changed to a direction perpendicular to the surface thereof, due to electro-optical effect. The optical waveguide 12 has a optical waveguide 121 from which light enters, a Y-branched optical waveguide 122 for branching the light, parallel linear optical waveguides 123 and 124 which are for propagating the branched light, a Y-branched optical waveguide 125 for multiplexing the branched light from the linear optical waveguides 123 and 124, and a optical waveguide 126 from which light is emitted, thereby forming a Mach-Zehnder type optical waveguide 12.

A buffer layer 17 is formed over the entire surface of the substrate 11 upon which the optical waveguide is formed.

A signal electrode 14 is formed above the linear optical waveguide 123 with the buffer layer 17 introduced there between, a ground electrode 132 is formed above the linear optical waveguide 124 with the buffer layer 17 introduced there between, and a ground electrode 131 is formed so as to surround the signal electrode 14. Bias electrodes 15 and 16 are formed in regions other than the region where the signal electrode 14 and ground electrode 131 are formed.

The bias electrode 15 has an over-waveguide electrode piece 151 and potential-setting electrode pieces 152 and 153, and the bias electrode 16 has an over-waveguide electrode piece 161 and potential-setting electrode pieces 162 and 163. The over-waveguide electrode pieces 151 and 161 are each formed above the linear optical waveguides 123 and 124 with the buffer layer 17 introduced there between. The potential-setting electrode pieces 152 and 153 are formed nearby both sides of the over-waveguide electrode piece 161, and the potential-setting electrode pieces 162 and 163 are formed nearby both sides of the over-waveguide electrode piece 151. Note that hereafter, a part of the electrodes will be referred to as "electrode piece".

An RF signal source 18 is connected to the signal electrode 14, and is applied as a modulation signal. A power source 19 is connected to the bias electrodes 15 and 16, and the phase of the light propagated over the linear optical waveguides 123 and 124 is controlled by controlling the operating point (DC bias value) of the modulation signals which the RF signal source 18 generates.

FIG. 2 illustrates a cross-section of the bias electrode region of the optical modulator shown in FIG. 1, along line A-B.

For example, the two optical waveguides 123 and 124 of the Mach-Zehnder optical waveguide are formed in parallel on the substrate 11 of LN which is a material having electro-optical effect, cut parallel to the Z-axis of the crystal axis direction. The buffer layer 17 is formed upon the substrate 11 where the optical waveguides 123 and 124 are formed.

The over-waveguide electrode pieces 151 and 161 of the bias electrodes 15 and 16 are formed above the optical waveguides 123 and 124, with the potential-setting electrode pieces 162 and 163 of the bias electrode 16 being formed near the over-waveguide electrode piece 151 so as to sandwich the over-waveguide electrode piece 151, and in the same way, the potential-setting electrode pieces 152 and 153 of the bias electrode 15 being formed near the over-waveguide electrode piece 161 so as to sandwich the over-waveguide electrode piece 161.

An electric field imposed on the optical waveguide 123 is generated between the over-waveguide electrode piece 151 and the potential-setting electrode pieces 162 and 163, with the intensity of the electrical field being determined by the potential difference between the over-waveguide electrode piece 151 and the potential-setting electrode pieces 162 and 163. In the same way, an electric field imposed on the optical waveguide 124 is generated between the over-waveguide electrode piece 161 and the potential-setting electrode pieces 152 and 153, with the intensity of the electrical field being determined by the potential difference between the over-waveguide electrode piece 161 and the potential-setting electrode pieces 152 and 153.

In order to realize reduction of voltage for the power source 19, a configuration has been realized wherein the potential-setting electrode pieces 152, 153, 162, and 163 are directly formed on the substrate 11, rather than being formed on the buffer layer 17.

First Embodiment

FIGS. 3A and 3B are diagrams for describing an embodiment of the optical modulator according to the present invention. An optical waveguide 12 is formed on a substrate 11 formed of lithium neonate (LiNbO₃, or simply LN) for example, cut parallel to the Z-axis of the crystal axis direction, by thermal dispersion of a metal film such as Ti or the like. The Z-cut substrate 11 has a crystal axis whereby the refractive index can be effectively changed to a direction perpendicular to the surface thereof, due to electro-optical effect. The optical waveguide 12 has a optical waveguide 121 from which light enters, a Y-branched optical waveguide 122 for branching the light, parallel linear optical waveguides 123 and 124 which are for propagating the branched light, a Y-branched optical waveguide 125 for multiplexing the branched light from the linear optical waveguides 123 and 124, and a optical waveguide 126 from which light is emitted, thereby forming a Mach-Zehnder type optical waveguide 12.

A buffer layer is formed over the entire surface of the substrate 11 upon which the optical waveguide 12 is formed. Next, the buffer layer is etched at both sides of both linear optical waveguides 123 and 124, nearby the linear optical waveguides 123 and 124 on the Y-branched optical waveguide 125 side thereof, thereby forming a buffer layer 27 wherein a part of the buffer layer has been removed. No optical waveguide 12 has been formed on the substrate 11 in the region where the buffer has been removed by etching. FIG. 3B shows just the buffer layer 27 formed on the substrate 11 shown in FIG. 3A.

A signal electrode 14 is formed above the optical waveguide 123 with the buffer layer 27 introduced there between, a ground electrode 132 is formed above the optical waveguide 124 with the buffer layer 27 introduced there between, and a ground electrode 131 is formed so as to surround the signal electrode 14. Bias electrodes 25 and 26 are formed in regions other than the region where the signal electrode 14 and ground electrode 131 are formed.

The bias electrode 25 has an over-waveguide electrode piece 251 and potential-setting electrode pieces 252 and 253, and the bias electrode 26 has an over-waveguide electrode piece 261 and potential-setting electrode pieces 262 and 263. The over-waveguide electrode pieces 251 and 261 are each formed above the linear optical waveguides 123 and 124 with the buffer layer 27 introduced there between. The potential-setting electrode pieces 252 and 253 are formed nearby both sides of the over-waveguide electrode piece 261, and the potential-setting electrode pieces 262 and 263 are formed nearby both sides of the over-waveguide electrode piece 251, these potential-setting electrode pieces being disposed directly upon the substrate 11 rather than on the buffer layer 27.

An RF signal source 18 is connected to the signal electrode 14, and is applied as a modulation signal. A power source 19 is connected to the bias electrodes 25 and 26, and the phase of the light propagated over the linear optical waveguides 123 and 124 is controlled by controlling the operating point (DC bias value) of the modulation signals which the RF signal source 18 generates.

The potential-setting electrode pieces 252 and 253 of the bias electrode 25 are formed on the buffer layer 27 at portions coming into contact with the main portion of the bias electrode 25 (the portion of the bias electrode 25 parallel to the A-B line, used for illustrating a cross-sectional view, in FIG. 3A), but are formed directly on the substrate 11 at portions where the buffer 27 has been removed by etching. The power source 19, for controlling the operating point of the modulation signals generated by the RF signal source 18, is connected to the bias electrodes 25 and 26.

FIG. 4 is a cross-sectional view of the bias electrode region of the optical modulator shown in FIGS. 3A and 3B, along line A-B in FIG. 3A.

For example, two parallel optical waveguides 123 and 124 of a Mach-Zehnder type optical waveguide are formed on a substrate 11 of LN which is a material having electro-optical effect, cut parallel to the Z-axis of the crystal axis direction.

The buffer layer 27 is formed upon the substrate 11 where the optical waveguides 123 and 124 are formed. However, the buffer layer is removed in the regions where the potential-setting electrode pieces 252, 253, 262, and 263, situated on both sides of each of the over-waveguide electrode pieces 251 and 261 nearby the optical waveguides 123 and 124, are formed, so that the potential-setting electrode pieces 252, 253, 262, and 263 are formed directly on the surface of the substrate 11.

The electric field applied to the optical waveguide 123 is generated between the over-waveguide electrode piece 251 formed above the buffer layer 27 and the potential-setting electrode pieces 262 and 263 directly formed on the surface of the substrate 11. The intensity of the electrical field is determined by the potential difference between the over-waveguide electrode piece 251 formed above the buffer layer 27 and the potential-setting electrode pieces 262 and 263. In the same way, the electric field applied to the optical waveguide 124 is generated between the over-waveguide electrode piece 261 formed above the buffer layer 27 and the potential-setting electrode pieces 252 and 253 directly formed on the surface of the substrate 11. The intensity of the electrical field is determined by the potential difference between the over-waveguide electrode piece 261 formed above the buffer layer 27 and the potential-setting electrode pieces 252 and 253.

In the region of the signal electrode 14 (the region surrounded by the ground electrode 131 in FIG. 3A), buffer layer properties affect the modulation bandwidth, driving power (driving voltage), and electrode characteristic impedance. However, within the region surrounded by the bias electrodes 25 and 26, the bias electrodes apply DC voltage, so the buffer layer can be removed except for the buffer layer over the optical waveguides. The buffer layer is necessary over the optical waveguides in order to reduce absorption loss of light propagated over the optical waveguides by the electrodes.

Thus, according to the present embodiment, the substrate 11 is a Z-cut substrate, so electric field can be effectively applied to the optical waveguides 123 and 124 by providing the over-waveguide electrode pieces 251 and 261 of the bias electrodes 25 and 26 directly above the optical waveguides 123 and 124 with the buffer layer 27 introduced there between. Also, forming the potential-setting electrode pieces 252, 253, 262, and 263 directly on the surface of the substrate 11 with no buffer layer introduced there between concentrates each of the electric line of force as to the optical waveguide 123 generated due to the potential difference applied between the over-waveguide electrode piece 251 and the potential-setting electrode pieces 262 and 263, and the electric line of force as to the optical waveguide 124 generated due to the potential difference applied between the over-waveguide electrode piece 261 and the potential-setting electrode pieces 252 and 253, thereby intensifying the intensity of the electric field applied to the optical waveguides 123 and 124. Thus, voltage reduction of the power source 19 can be realized.

Second Embodiment

Figure 5A:
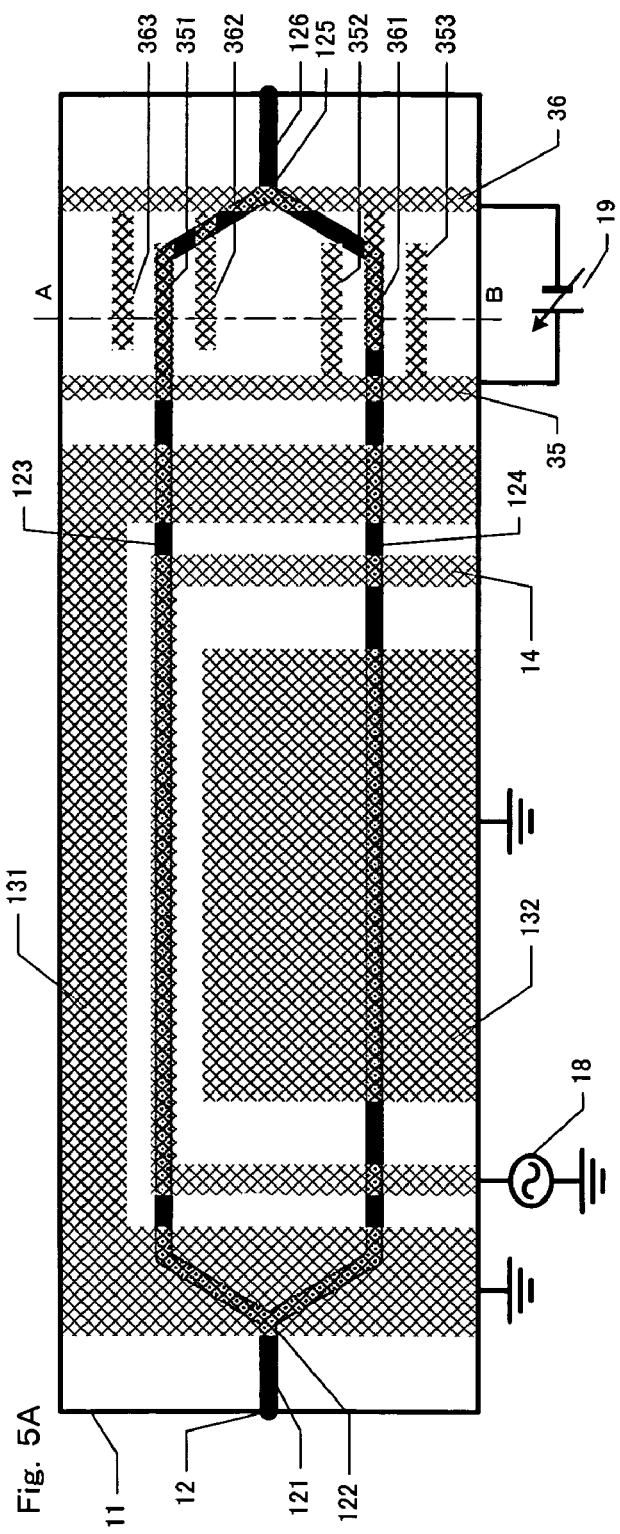
FIGS. 5A and 5B are diagrams for describing an optical modulator according to the present invention.
Figure 5B:
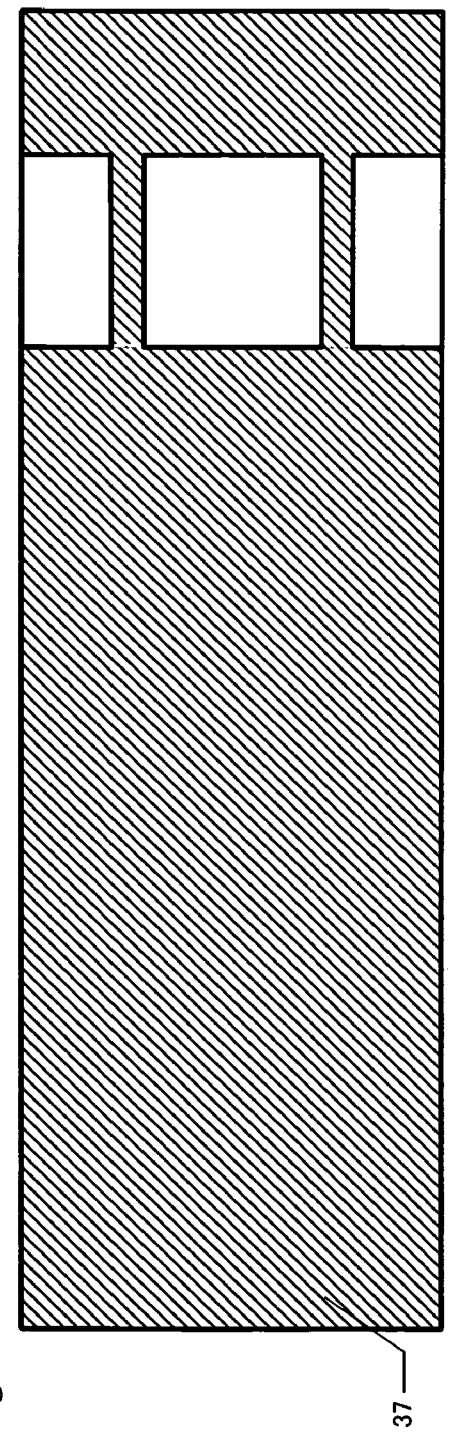
Figure 6:
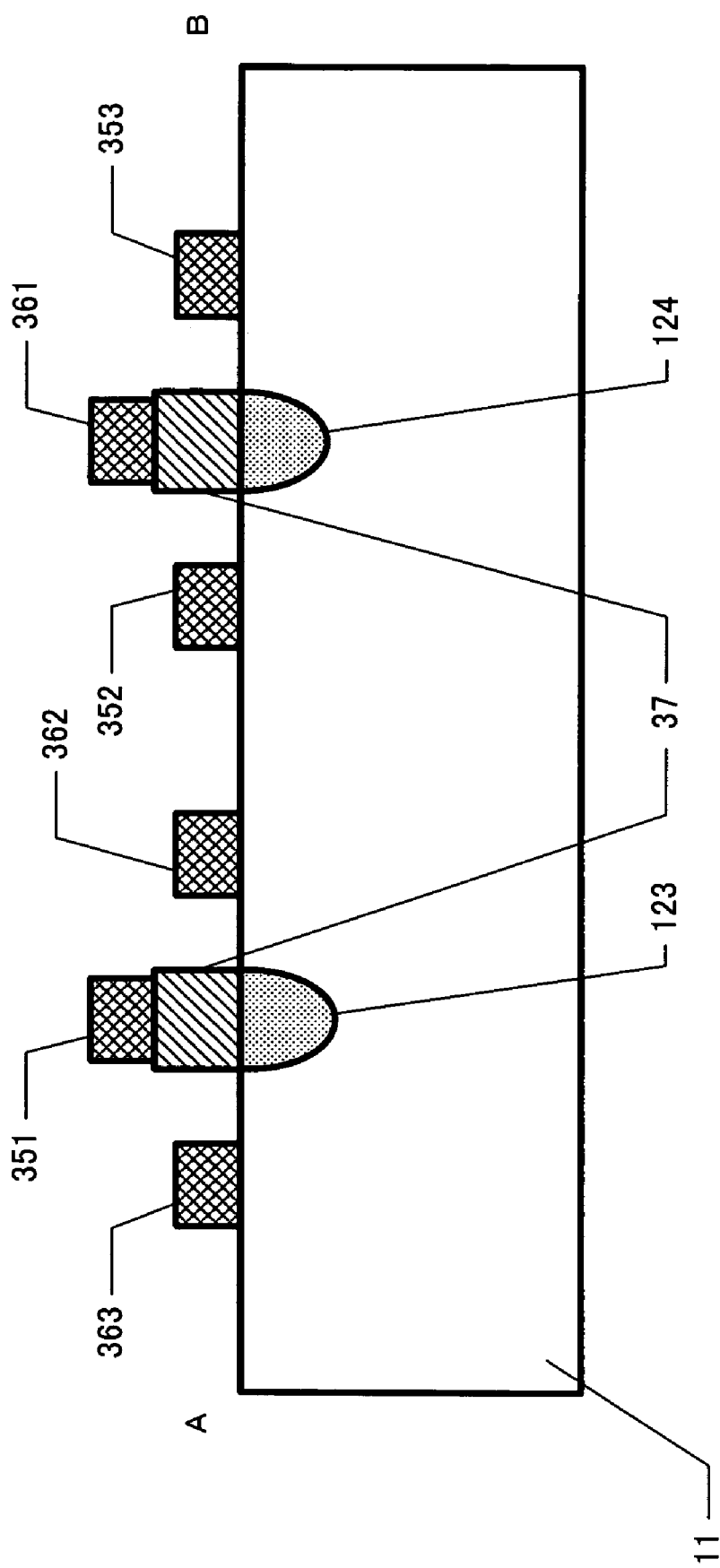
FIG. 6 is a cross-sectional view of a bias electrode region of the optical modulator shown in FIGS. 5A and 5B.

FIGS. 5A and 5B are diagrams for describing a second embodiment of the optical modulator according to the present invention. FIG. 6 is a cross-sectional view of the bias electrode region of the optical modulator shown in FIGS. 5A and 5B.

The optical modulator shown in FIGS. 5A, 5B, and 6, differs from the optical modulator described above with the first embodiment with regard to the configuration of the buffer layer in the regions where the bias electrodes 35 and 36 are formed. For example, the buffer layer 37 is formed in the formation region of the bias electrodes 35 and 36 wherein the optical waveguides where the linear optical waveguides 123 and 124, Y-branched optical waveguide 125, and optical waveguide 126, are formed, and the buffer layer 37 is not formed in other formation regions of the bias electrodes 35 and 36. FIG. 5B shows just the buffer layer 37 formed on the substrate 11 shown in FIG. 5A.

As shown in FIG. 6, for example, in the region where the bias electrodes 35 and 36 are formed, the over-waveguide electrode pieces 351 and 361 to be disposed over the linear optical waveguides 123 and 124 are formed with the buffer layer 37 introduced there between. Also, each of the potential-setting electrode pieces 362 and 363 situated nearby the over-waveguide electrode piece 351, and the potential-setting electrode pieces 352 and 353 situated nearby the over-waveguide electrode piece 361, are formed directly on the surface of the Z-cut substrate 11, with no buffer layer there between.

Thus, according to the present embodiment, the substrate 11 is a Z-cut substrate, so electric field can be effectively applied to the optical waveguides 123 and 124 by providing the over-waveguide electrode pieces 351 and 361 of the bias electrodes 35 and 36 directly above the optical waveguides 123 and 124 with the buffer layer 37 introduced there between. Also, forming the potential-setting electrode pieces 352, 353, 362, and 363 directly on the surface of the substrate 11 with no buffer layer introduced there between concentrates each of the electric line of force as to the optical waveguide 123 generated due to the potential difference applied between the over-waveguide electrode piece 351 and the potential-setting electrode pieces 362 and 363, and the electric line of force as to the optical waveguide 124 generated due to the potential difference applied between the over-waveguide electrode piece 361 and the potential-setting electrode pieces 352 and 353, thereby intensifying the intensity of the electric field applied to the optical waveguides 123 and 124. Thus, voltage reduction of the power source 19 can be realized.

Third Embodiment

Figure 7A:
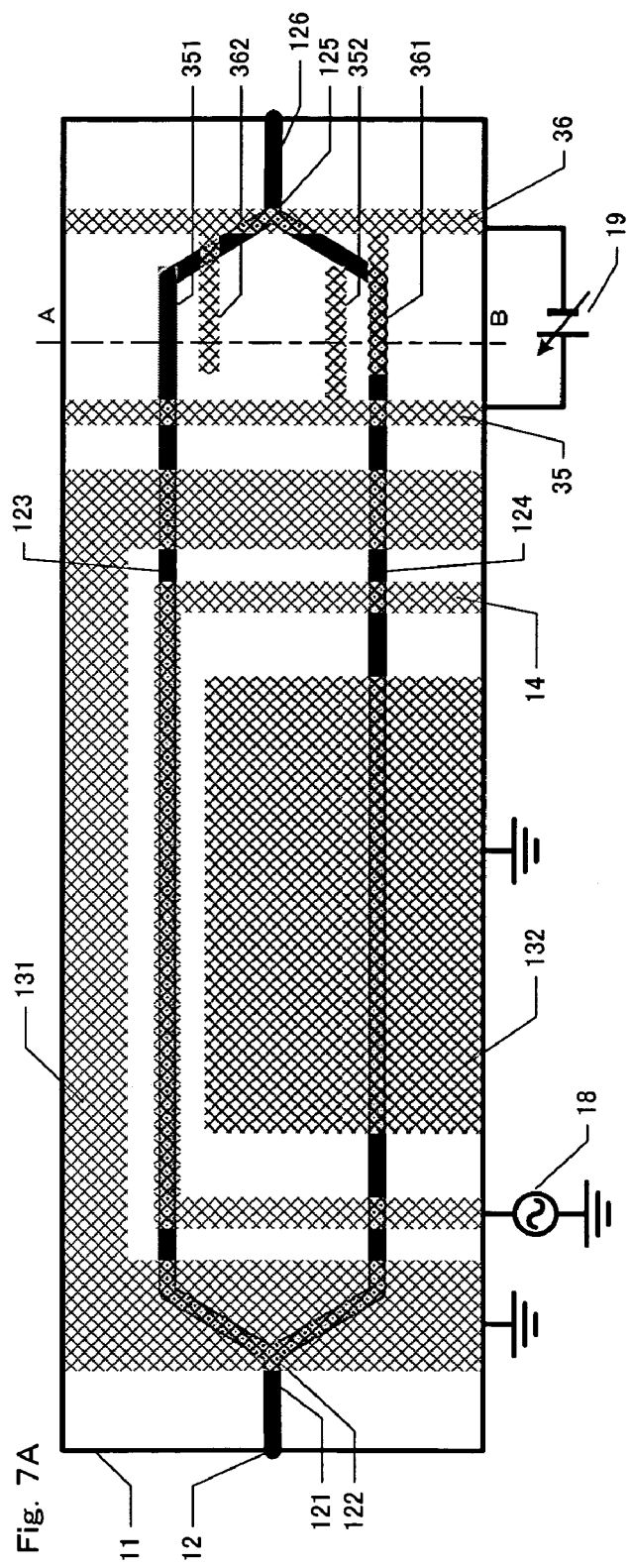
FIGS. 7A and 7B are diagrams for describing an optical modulator according to the present invention.
Figure 7B:
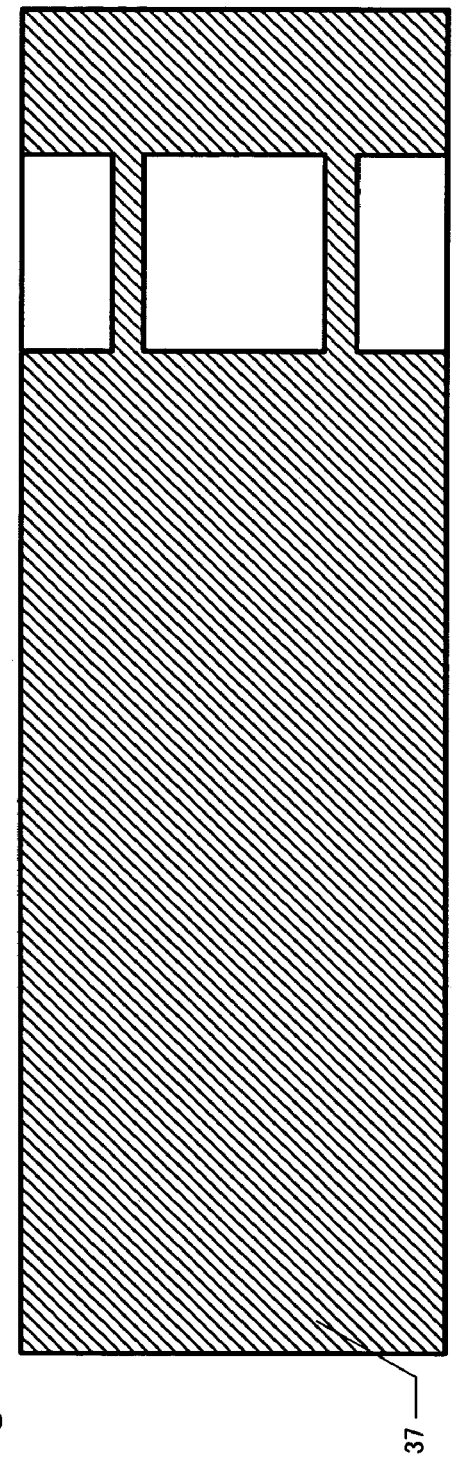

FIGS. 7A and 7B are diagrams for describing a third embodiment of the optical modulator according to the present invention. FIG. 8 is a cross-sectional view of the bias electrode region of the optical modulator shown in FIGS. 7A and 7B.

The optical modulator shown in FIGS. 7A, 7B, and 8, differs from the optical modulator described above with the second embodiment with regard to the configuration of the bias electrodes. Note that FIGS. 7A, 7B, and 8 use the same reference numerals as with FIGS. 5A, 5B, and 6.

For example, the bias electrode 35 is formed of the over-waveguide electrode piece 351 and a single potential-setting electrode piece 352. Also, the bias electrode 36 is formed of the over-waveguide electrode piece 361 and a single potential-setting electrode piece 362. The potential-setting electrode pieces 352 and 362 are directly formed on the surface of the substrate 11. FIG. 7B shows just the buffer layer 37 formed on the substrate 11 shown in FIG. 7A.

Thus, according to the present embodiment as well, the substrate 11 is a Z-cut substrate, so electric field can be effectively applied to the optical waveguides 123 and 124 by providing the over-waveguide electrode pieces 351 and 361 of the bias electrodes 35 and 36 directly above the optical waveguides 123 and 124 with the buffer layer 37 introduced there between. Also, forming the potential-setting electrode pieces 352 and 362 directly on the surface of the substrate 11 with no buffer layer introduced there between concentrates each of the electric line of force as to the optical waveguide 123 generated due to the potential difference applied between the over-waveguide electrode piece 351 and the potential-setting electrode piece 362, and the electric line of force as to the optical waveguide 124 generated due to the potential difference applied between the over-waveguide electrode piece 361 and the potential-setting electrode piece 352, thereby intensifying the intensity of the electric field applied to the optical waveguides 123 and 124. Thus, voltage reduction of the power source 19 can be realized.

Also, while the potential-setting electrode piece 352 of the bias electrode 35 and the potential-setting electrode piece 362 of the bias electrode 36 were used as potential-setting electrode pieces in the present embodiment, the same advantages can be obtained with an arrangement wherein the potential-setting electrode piece 353 of the bias electrode 35 and the potential-setting electrode piece 363 of the bias electrode 36 are used to this end.

Also, the same advantages as with the present embodiment can be obtained by applying the bias electrode configuration described in the present embodiment to an optical modulator having a buffer layer formation for the bias electrode region that is different from that described with the first embodiment.

Fourth Embodiment

Figure 9:
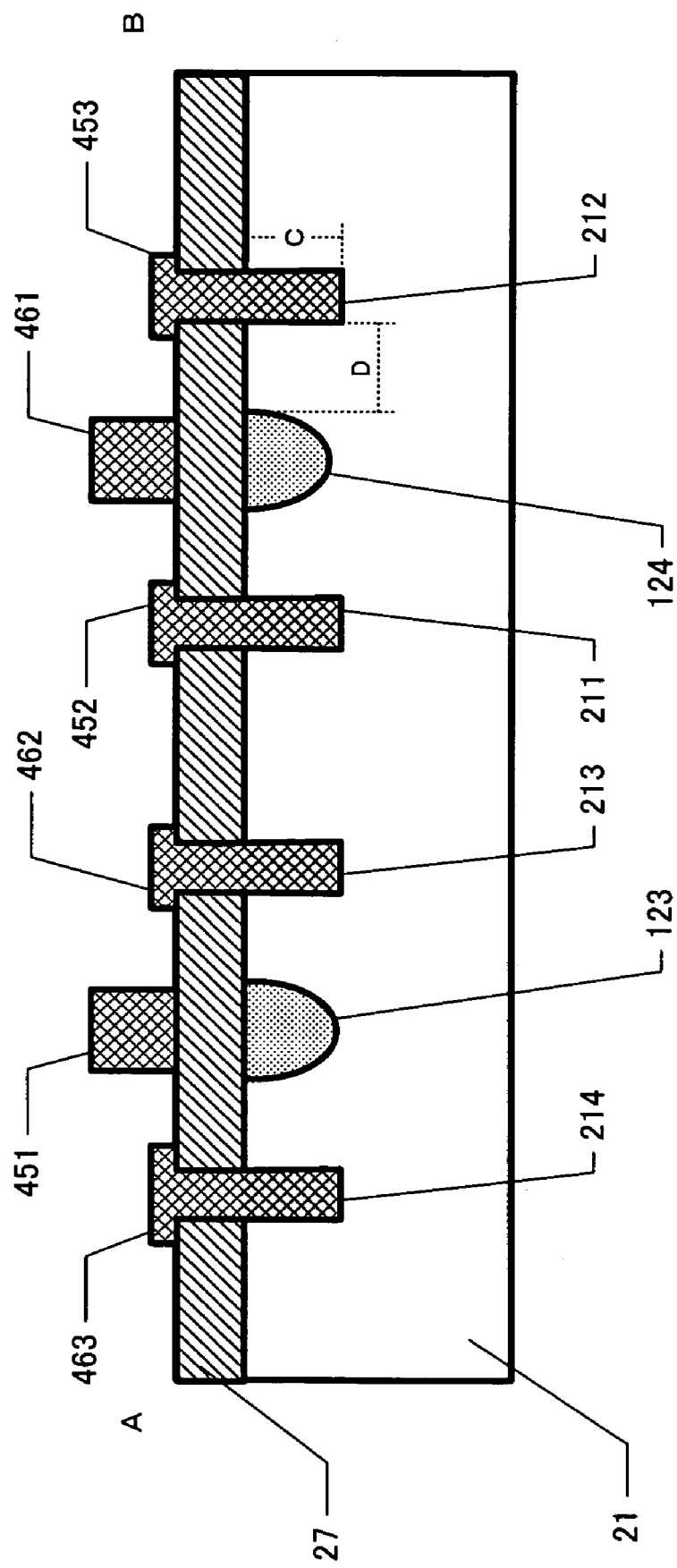
FIG. 9 is a cross-sectional view of a bias electrode region of the optical modulator according to the present invention.

FIG. 9 is a cross-sectional view illustrating the bias electrode region of a fourth embodiment of the optical modulator according to the present invention. The optical modulator shown in FIG. 9 differs from the optical modulator according to the first embodiment (see FIGS. 3A, 3B, and 4) in that the configuration of the bias electrodes, in particular the potential-setting electrode pieces 452, 453, 462, and 463, and also the configuration of the Z-cut substrate 21, are different.

For example, the bias electrode 45 (equivalent to the bias electrode 25 in FIG. 3A) is configured of the over-waveguide electrode piece 451 and the potential-setting electrode pieces 452 and 453, and the bias electrode 46 (equivalent to the bias electrode 26 in FIG. 3A) is configured of the over-waveguide electrode piece 461 and the potential-setting electrode pieces 462 and 463. The potential-setting electrode pieces 452 and 453 are formed in grooves 211 and 212 formed on the substrate 21 in parallel nearby the linear optical waveguide 124. In the same way, the potential-setting electrode pieces 462 and 463 are formed in grooves 213 and 214 formed on the substrate 21 in parallel nearby the linear optical waveguide 123.

On the substrate 21, grooves 213 and 214 are formed parallel to the linear optical waveguide 123, nearby the linear optical waveguide 123, and in the same way, grooves 211 and 212 are formed parallel to the linear optical waveguide 124, nearby the linear optical waveguide 124, within the region surrounded by the bias electrodes 45 and 46.

Thus, according to the present embodiment, the substrate 21 is a Z-cut substrate, so electric field can be effectively applied to the optical waveguides 123 and 124 by providing the over-waveguide electrode pieces 451 and 461 of the bias electrodes 45 and 46 directly above the optical waveguides 123 and 124 with the buffer layer 27 introduced there between. Also, forming the grooves 211, 212, 213, and 214, on the substrate 21, and forming the potential-setting electrode pieces 452, 453, 462, and 463, in the respective grooves 211 through 214, such that the distance between the optical waveguide 123 and the potential-setting electrode pieces 462 and 463, and the distance between the optical waveguide 124 and the potential-setting electrode pieces 452 and 453 are each shorter, concentrates each of the electric line of force as to the optical waveguide 123 generated due to the potential difference applied between the over-waveguide electrode piece 451 and the potential-setting electrode pieces 462 and 463, and the electric line of force as to the optical waveguide 124 generated due to the potential difference applied between the over-waveguide electrode piece 461 and the potential-setting electrode pieces 452 and 453, thereby intensifying the intensity of the electric field applied to the optical waveguides 123 and 124. Thus, voltage reduction of the power source 19 can be realized.

Fifth Embodiment

Figure 10:
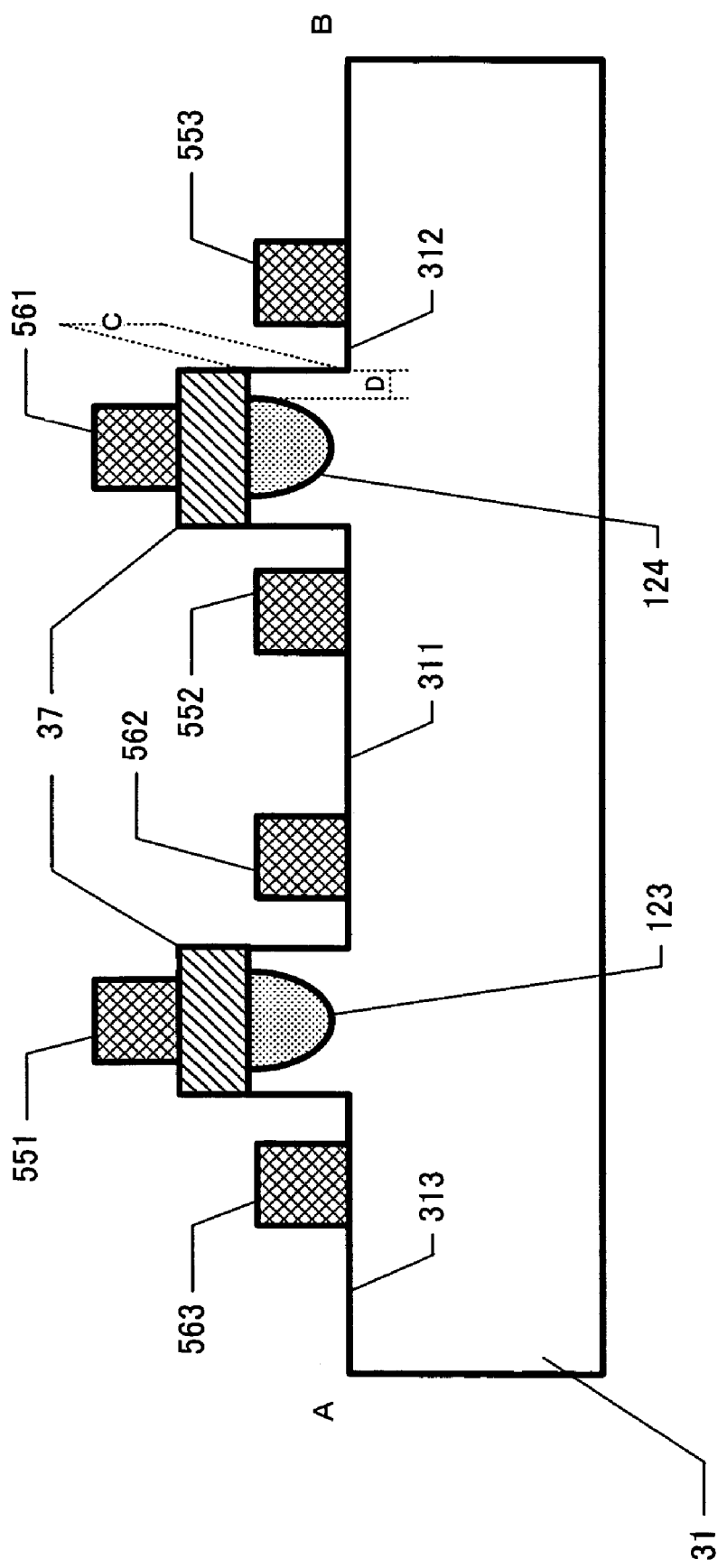
FIG. 10 is a cross-sectional view of a bias electrode region of the optical modulator according to the present invention.

FIG. 10 is a cross-sectional view illustrating the bias electrode region of a fifth embodiment of the optical modulator according to the present invention. The optical modulator shown in FIG. 10 differs from the optical modulator according to the second embodiment (see FIGS. 5A, 5B, and 6) in that the configuration of the Z-cut substrate 31 is different.

For example, the two optical waveguides 123 and 124 of the Mach-Zehnder optical waveguide are formed in parallel on the substrate 31 of LN which is a material having electro-optical effect, cut parallel to the Z-axis of the crystal axis direction.

In a region surrounded by the bias electrode 55 (equivalent to the bias electrode 35 in FIG. 5A) and the bias electrode 56 (equivalent to the bias electrode 36 in FIG. 5A), grooves 311, 312 and 313 are formed on the substrate 31, parallel to the linear optical waveguides 123 and 124, nearby the linear optical waveguides 123 and 124.

The bias electrode 55 is configured of the over-waveguide electrode piece 551 and potential-setting electrode pieces 552 and 553, and the bias electrode 56 is configured of the over-waveguide electrode piece 561 and potential-setting electrode pieces 562 and 563. The potential-setting electrode piece 552 is formed on the base of the groove 311 formed on the substrate 31 in parallel to the linear optical waveguide 124, nearby the linear optical waveguide 124. The potential-setting electrode piece 553 is formed on the base of the groove 312 formed on the substrate 31 in parallel to the linear optical waveguide 124, nearby the linear optical waveguide 124. In the same way, the potential-setting electrode piece 562 is formed on the base of the groove 311 formed on the substrate 31 in parallel to the linear optical waveguide 123, nearby the linear optical waveguide 123, and the potential-setting electrode piece 563 is formed on the base of the groove 313 formed on the substrate 31 in parallel to the linear optical waveguide 123, nearby the linear optical waveguide 123.

According to the present embodiment, as with the fourth embodiment, the substrate 31 is a Z-cut substrate, so electric field can be effectively applied to the optical waveguides 123 and 124 by providing the over-waveguide electrode pieces 551 and 561 of the bias electrodes 55 and 56 directly above the optical waveguides 123 and 124 with the buffer layer 37 introduced there between. Also, forming the grooves 311, 312, and 313, on the substrate 31, and forming the potential-setting electrode pieces 552, 553, 562, and 563, in the bottom of the respective grooves 311 through 313, concentrates each of the electric line of force as to the optical waveguide 123 generated due to the potential difference applied between the over-waveguide electrode piece 551 and the potential-setting electrode pieces 562 and 563, and the electric line of force as to the optical waveguide 124 generated due to the potential difference applied between the over-waveguide electrode piece 561 and the potential-setting electrode pieces 552 and 553, thereby intensifying the intensity of the electric field applied to the optical waveguides 123 and 124. Thus, voltage reduction of the power source 19 can be realized.

Sixth Embodiment

Figure 11:
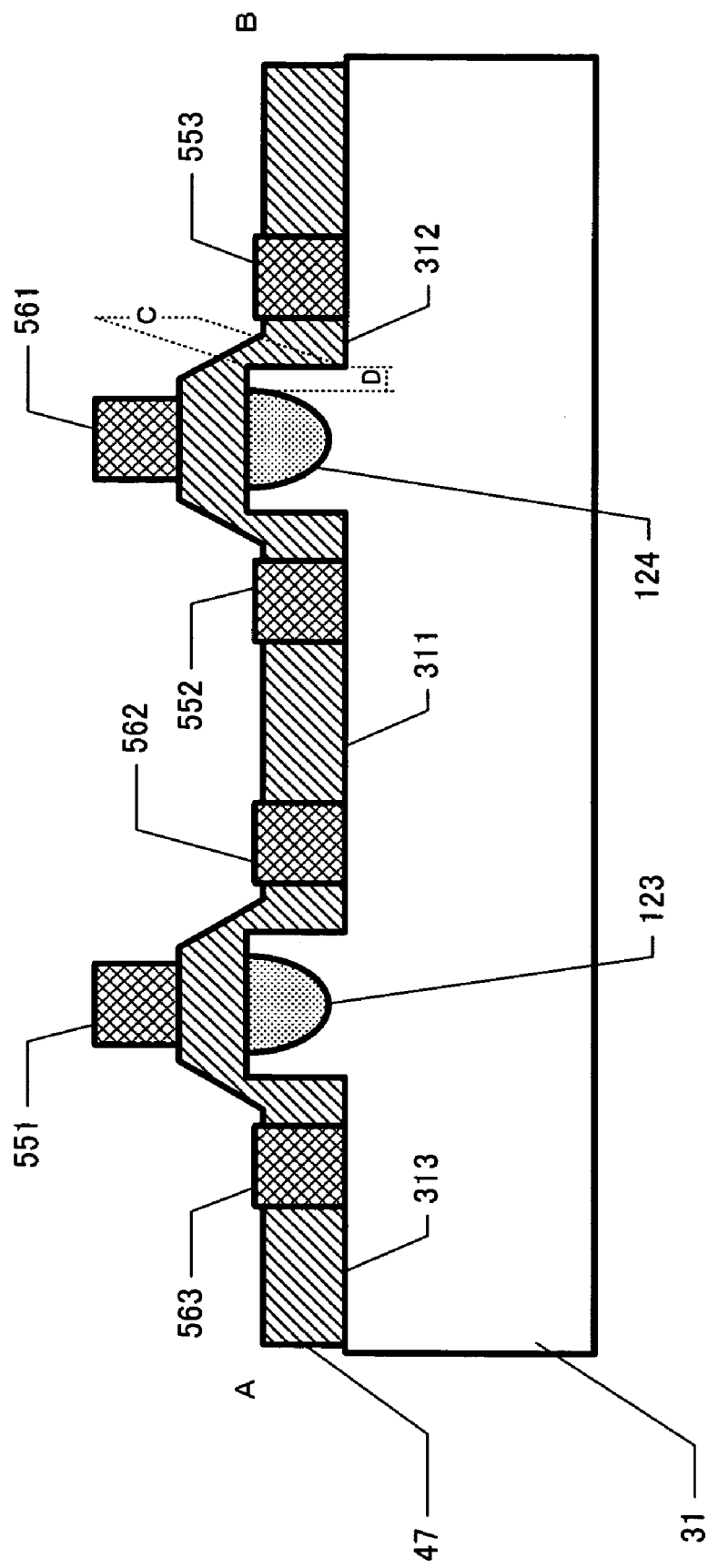
FIG. 11 is a cross-sectional view of a bias electrode region of the optical modulator according to the present invention.

FIG. 11 is a cross-sectional view illustrating the bias electrode region of a sixth embodiment of the optical modulator according to the present invention. The optical modulator shown in FIG. 11 differs from the optical modulator according to the fifth embodiment (see FIG. 10) in that the configuration of the buffer layer 47 is different.

For example, in a region surrounded by the bias electrode 55 (equivalent to the bias electrode 35 in FIG. 5A) and the bias electrode 56 (equivalent to the bias electrode 36 in FIG. 5A), the buffer layer 47 is formed over the surface of the substrate 31 described in FIG. 10, except for the potential-setting electrode pieces 552, 553, 562, and 563, as with the buffer layer 27 in the above-described first embodiment.

Accordingly, the advantages of the fifth embodiment can be had with the present embodiment as well.

Seventh Embodiment

FIGS. 12A and 12B are diagrams for describing a sixth embodiment of the optical modulator according to the present invention. An optical waveguide 12 is formed on a substrate 41 formed of LN for example, cut parallel to the Z-axis of the crystal axis direction, and a polarization inversion region 42 with an inverted polarity that has been partially formed on the substrate 41, by thermal dispersion of a metal film such as Ti or the like. The optical waveguide 12 has a optical waveguide 121 from which light enters, a Y-branched optical waveguide 122 for branching the light, parallel linear optical waveguides 123 and 124 which are for propagating the branched light, a Y-branched optical waveguide 125 for multiplexing the branched light from the linear optical waveguides 123 and 124, and a optical waveguide 126 from which light is emitted, thereby forming a Mach-Zehnder type optical waveguide 12.

A buffer layer is formed over the entire surface of the substrate 41 upon which the optical waveguide 12 is formed, as well as the polarization inversion region 42. Next, the buffer layer is etched at both sides of both linear optical waveguides 123 and 124, nearby the linear optical waveguides 123 and 124 on the Y-branched optical waveguide 125 side thereof, thereby forming a buffer layer 57 wherein a part of the buffer layer has been removed. No optical waveguide 12 has been formed on the substrate 41 and polarization inversion region 42 in the regions where the buffer has been removed by etching. FIG. 12B shows just the buffer layer 57 formed on the substrate 41 shown in FIG. 12A.

A signal electrode 14 is formed above the optical waveguide 123 with the buffer layer 57 introduced there between, a ground electrode 132 is formed above the optical waveguide 124 with the buffer layer 57 introduced there between, and a ground electrode 131 is formed so as to surround the signal electrode 14.

Bias electrodes 65 and 66 are formed in regions other than the region where the signal electrode 14 and ground electrode 131 are formed. The bias electrode 65 is configured of over-waveguide electrode pieces 6511 and 6512 formed above the linear optical waveguides 123 and 124 with the buffer layer 57 introduced there between. The bias electrode 66 is configured of potential-setting electrode pieces 662 and 663 formed nearby the over-waveguide electrode pieces 6511 and 6512 and a potential-setting electrode piece 664 formed at the boundary between the substrate 41 and the polarization inversion region 42, with the potential-setting electrode pieces 662, 663, and 664 being in direct contact with the surface of the substrate 41 including the polarization inversion region 42.

The potential-setting electrode pieces 662, 663, and 664 of the bias electrode 66 are formed on the buffer layer 57 such that the bias electrode 66 is not directly formed upon the optical waveguide in regions connecting to the main body of the bias electrode 66 (the portion of the bias electrode 66 parallel to the A-B line, used for illustrating a cross-sectional view, in FIG. 12A), but are formed directly on the substrate 41 including the polarization inversion region 42 at portions where the buffer 57 has been removed by etching.

An RF signal source 18 is connected to the signal electrode 14, and an RF signal is applied as a modulation signal. A power source 19 is connected to the bias electrodes 65 and 66, bias voltage is applied, and the phase of the light propagated over the linear optical waveguides 123 and 124 is controlled by controlling the operating point of the modulation signals which the RF signal source 18 generates.

Figure 13:
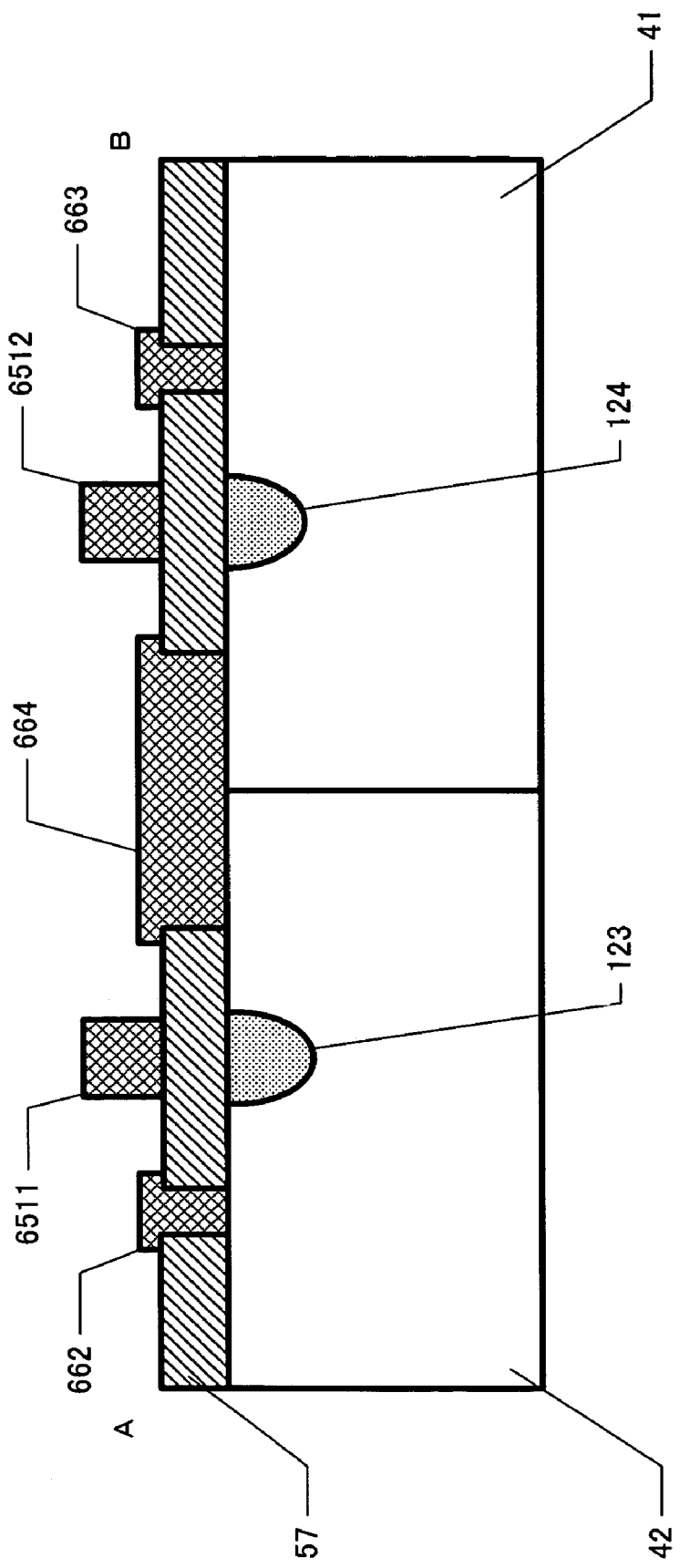
FIG. 13 is a cross-sectional view of a bias electrode region of the optical modulator shown in FIGS. 12A and 12B.

FIG. 13 is a cross-sectional view of the bias electrode region of the optical modulator shown in FIGS. 12A and 12B, along line A-B in FIG. 12A.

For example, two parallel optical waveguides 123 and 124 of a Mach-Zehnder type optical waveguide are formed on a substrate 41 of LN which is a material having electro-optical effect, cut parallel to the Z-axis of the crystal axis direction, and a polarization inversion region 42 with an inverted polarity that has been partially formed on the substrate 41.

The buffer layer 57 is formed upon the polarization inversion region 42 where the optical waveguide 123 is formed, and upon the substrate 41 where the optical waveguide 124 is formed. However, nearby the optical waveguides 123 and 124, the buffer layer is removed in the regions where the potential-setting electrode pieces 662 and 663, situated nearby the over-waveguide electrode pieces 6511 and 6512, and the potential-setting electrode 664 situated on the boundary between the substrate 41 and the polarization inversion region 42, are formed, with the potential-setting electrode pieces 662, 663, and 664 being formed directly on the substrate 41 including the polarization inversion region 42.

The electric field applied to the optical waveguide 123 is generated between the over-waveguide electrode piece 6511 formed above the buffer layer 57 and the potential-setting electrode pieces 662 and 664 directly formed on the surface of the polarization inversion region 42. The intensity of the electrical field is determined by the potential difference between the over-waveguide electrode piece 6511 formed above the buffer layer 57 and the potential-setting electrode pieces 662 and 664. In the same way, the electric field applied to the optical waveguide 124 is generated between the over-waveguide electrode piece 6512 formed above the buffer layer 57 and the potential-setting electrode pieces 663 and 664 directly formed on the surface of the substrate 41. The intensity of the electrical field is determined by the potential difference between the over-waveguide electrode piece 6512 formed above the buffer layer 47 and the potential-setting electrode pieces 663 and 664.

The Z-cut substrate 41 and the polarization inversion region 42 have crystal axes whereby the refractive index can be effectively changed to a direction perpendicular to the surface thereof, due to electro-optical effect, and have properties of opposite phase change due to the electro-optical effect. Accordingly, even in the event that the over-waveguide electrode pieces 6511 and 6512 have potential of the same polarity, the change in phase of the light propagated over the optical waveguides 123 and 124 is opposite.

In the region of the signal electrode 14 (the region surrounded by the ground electrode 131 in FIG. 12A), buffer layer properties affect the modulation bandwidth, driving power (driving voltage), and electrode characteristic impedance. However, within the region surrounded by the bias electrodes 65 and 66, the bias electrodes apply DC voltage, so the buffer layer can be removed except for over the optical waveguides. The buffer layer is necessary over the optical waveguides in order to reduce absorption loss of light propagated over the optical waveguides by the electrodes.

Thus, according to the present embodiment, the substrate 41 including the polarization inversion region 42 is a Z-cut substrate, so electric field can be effectively applied to the optical waveguides 123 and 124 by providing the over-waveguide electrode pieces 6511 and 6512 of the bias electrode 65 directly above the optical waveguides 123 and 124 with the buffer layer 57 introduced there between. Also, forming the potential-setting electrode pieces 662, 663, and 664 directly on the surface of the substrate 41 including the polarization inversion region 42 with no buffer layer introduced there between concentrates each of the electric line of force as to the optical waveguide 123 generated due to the potential difference applied between the over-waveguide electrode piece 6511 and the potential-setting electrode pieces 662 and 664, and the electric line of force as to the optical waveguide 124 generated due to the potential difference applied between the over-waveguide electrode piece 6512 and the potential-setting electrode pieces 663 and 664, thereby intensifying the intensity of the electric field applied to the optical waveguides 123 and 124. Thus, voltage reduction of the power source 19 can be realized.

Eighth Embodiment

Figure 14A:
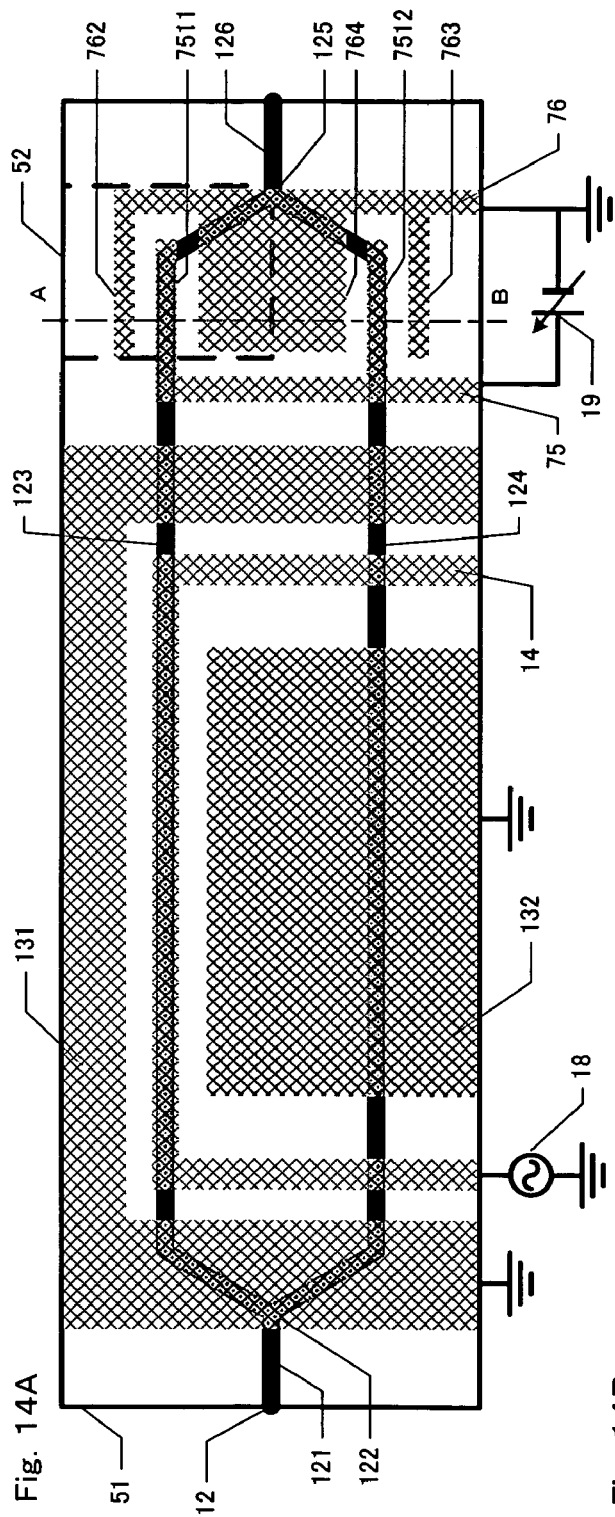
FIGS. 14A and 14B are diagrams for describing an optical modulator according to the present invention.
Figure 14B:
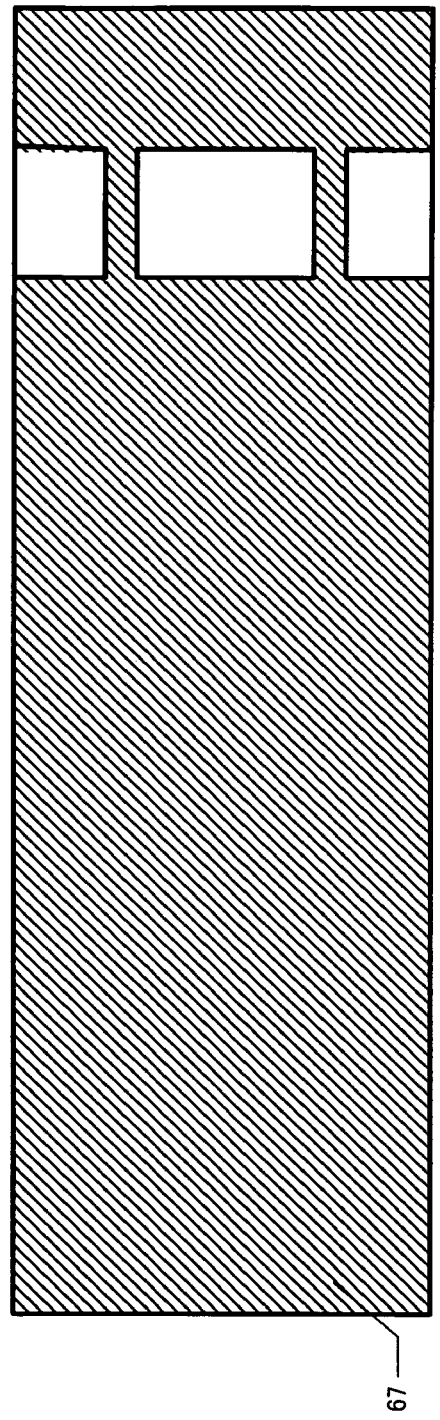
Figure 15:
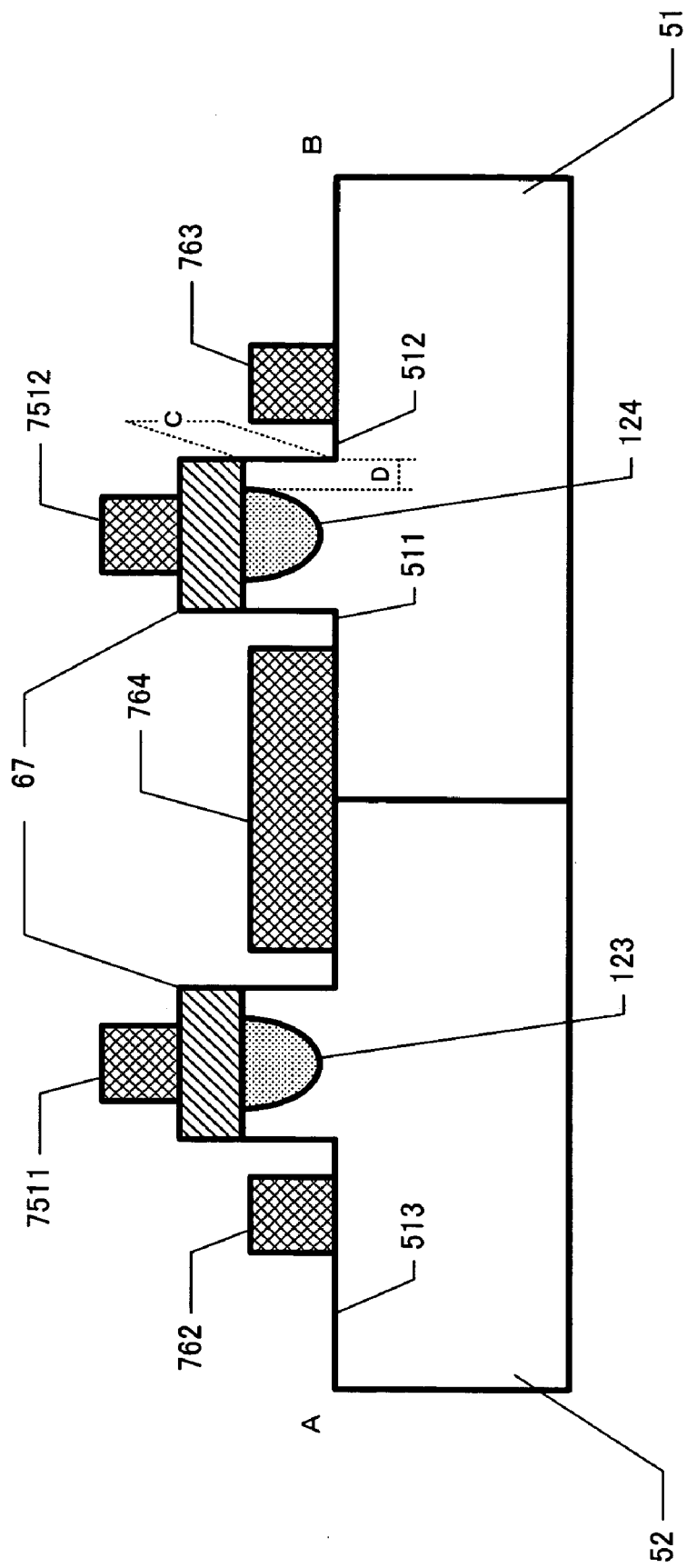
FIG. 15 is a cross-sectional view of a bias electrode region of the optical modulator shown in FIGS. 14A and 14B.

FIGS. 14A and 14B are diagrams for describing an eighth embodiment of the optical modulator according to the present invention. FIG. 15 is a cross-sectional view of the bias electrode region of the optical modulator shown in FIGS. 14A and 14B.

The optical modulator shown in FIGS. 14A, 14B, and 15, differs from the optical modulator described above with the seventh embodiment with regard to the configuration of the buffer layer in the region where the bias electrodes 75 and 76 are formed. For example, the buffer layer 67 is formed in the formation region of the bias electrodes 75 and 76 wherein the optical waveguides 123, 124, 125, and 126 are formed, and the buffer layer 67 is not formed in other formation regions of the bias electrodes 75 and 76. Note that the bias electrode 76 is ground potential.

As shown in FIG. 15, in the region where the bias electrodes 75 and 76 are formed, the over-waveguide electrode pieces 7511 and 7512 to be disposed over the linear optical waveguides 123 and 124 are formed with the buffer layer 67 introduced there between. Also, the potential-setting electrode pieces 762, 763, and 764, situated nearby the over-waveguide electrode pieces 7511 and 7512, are formed directly on the surface of grooves 511, 512, and 513 on the Z-cut substrate 51 including the polarization inversion region 52, with no buffer layer there between. FIG. 14B shows just the buffer layer 67 formed on the substrate 51 shown in FIG. 14A.

Thus, according to the present embodiment, the substrate 51 including the polarization inversion region 52 is a Z-cut substrate, so electric field can be effectively applied to the optical waveguides 123 and 124 by providing the over-waveguide electrode pieces 7511 and 7512 of the bias electrodes 75 and 76 directly above the optical waveguides 123 and 124 with the buffer layer 67 introduced there between. Also, forming the potential-setting electrode pieces 762, 763, and 764 directly on the surface of the substrate 51 including the polarization inversion region 52 with no buffer layer introduced there between concentrates each of the electric line of force as to the optical waveguide 123 generated due to the potential difference applied between the over-waveguide electrode piece 7511 and the potential-setting electrode pieces 762 and 763, and the electric line of force as to the optical waveguide 124 generated due to the potential difference applied between the over-waveguide electrode piece 7512 and the potential-setting electrode pieces 763 and 764, thereby intensifying the intensity of the electric field applied to the optical waveguides 123 and 124. Thus, voltage reduction of the power source 19 can be realized.

Note that with the bias electrode described above in the fourth through eighth embodiments, the main body of the bias electrode and the potential-setting electrode pieces are not on the same plane, so the connection portions of the potential-setting electrode formed on the base of the grooves as to the bias electrode main body formed in a region with no groove, are to be formed on the side face of the grooves.

Ninth Embodiment

Figure 16A:
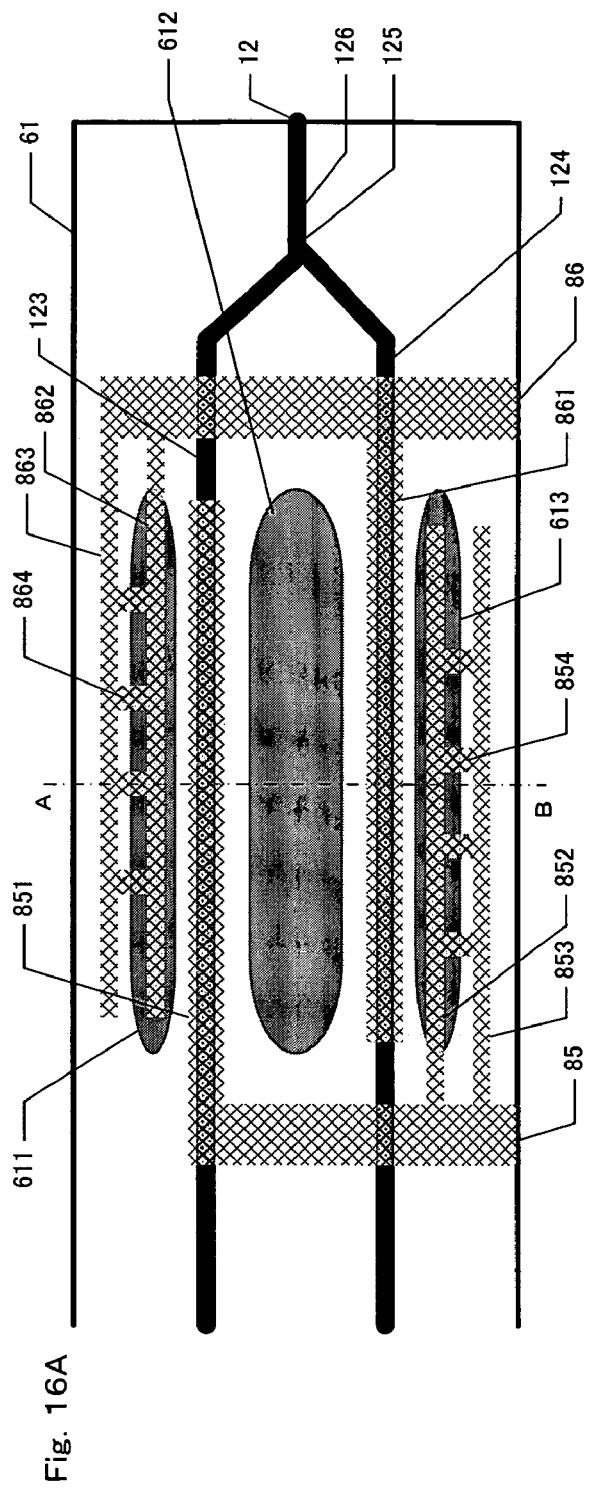
FIGS. 16A and 16B are diagrams for describing an optical modulator according to the present invention.
Figure 16B:
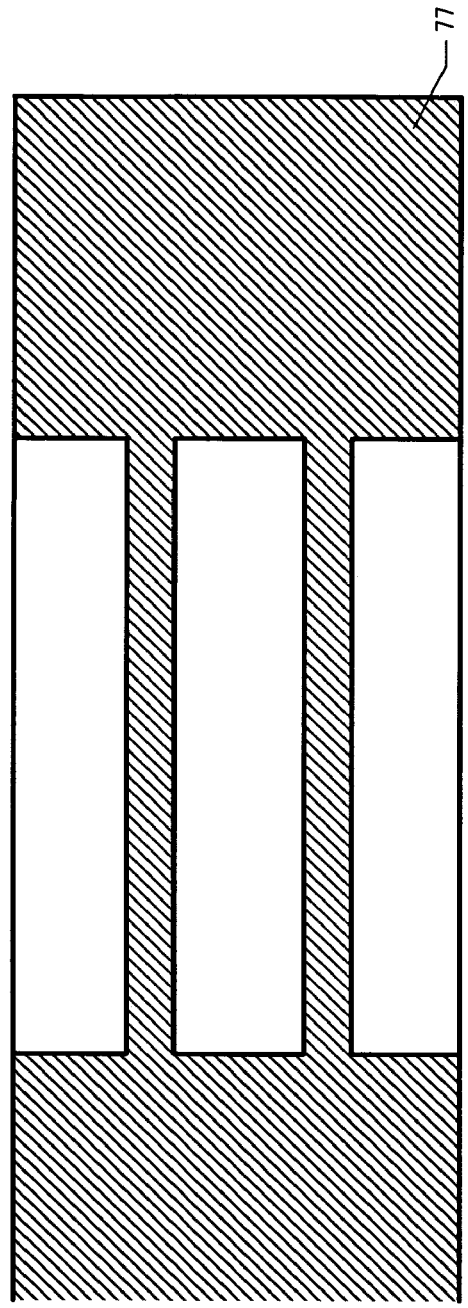
Figure 17:
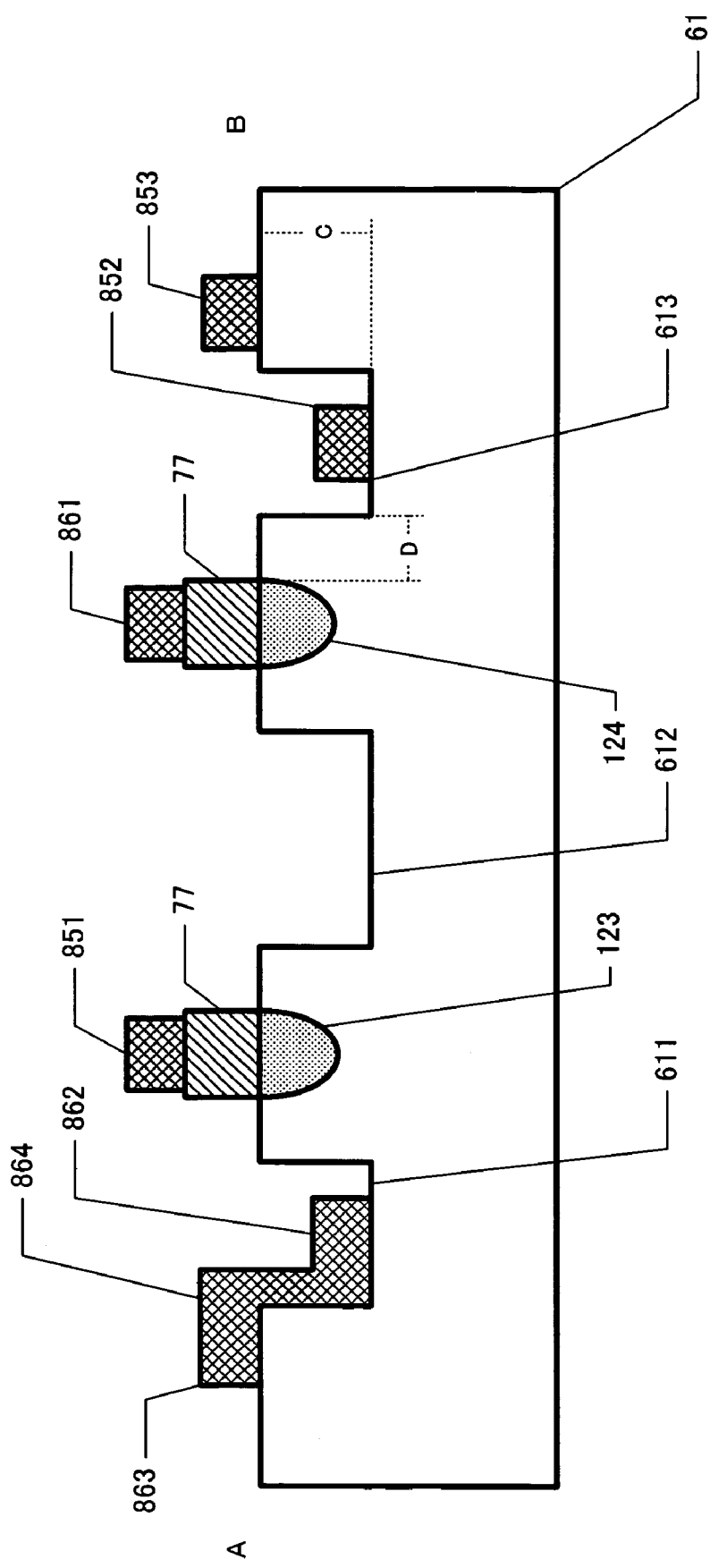
FIG. 17 is a cross-sectional view of a bias electrode region of the optical modulator shown in FIGS. 16A and 16B.

FIGS. 16A and 16B are diagrams for describing a ninth embodiment of the optical modulator according to the present invention. FIG. 17 is a cross-sectional view of the bias electrode region of the optical modulator shown in FIGS. 16A and 16B.

FIGS. 16A and 16B are for describing the region of the bias electrodes 85 and 86, described in an earlier embodiment, and the configuration thereof has a different structure of the bias electrodes 85 and 86 from that in the fifth embodiment, and also grooves are formed in a part of the Z-cut substrate, where the potential-setting electrode pieces of the bias electrodes 85 and 86 are situated.

The bias electrode 85 is configured of an over-waveguide electrode piece 851 and two potential-setting electrode pieces 852 and 853, and also one or more connecting electrode piece 854 for connecting the potential-setting electrode pieces 852 and 853 in a ladder-like manner. In the same way, the bias electrode 86 is configured of an over-waveguide electrode piece 861 and two potential-setting electrode pieces 862 and 863, and also one or more connecting electrode piece 854 for connecting the two potential-setting electrode pieces 862 and 863 in a ladder-like manner.

On the Z-cut substrate 61, grooves 611, 612, and 613 are formed parallel to the optical waveguides 123 and 124, nearby the optical waveguides 123 and 124. The edge faces of the grooves 611, 612, and 613 are tapered so as to reduce light loss.

The over-waveguide electrode pieces 851 and 861 are formed over the respective optical waveguides 123 and 124, with the buffer layer 77 introduced there between. FIG. 16B shows just the buffer layer 77 formed on the substrate 61 shown in FIG. 16A.

The potential-setting electrode piece 862 is formed directly on the bottom of the groove 611, the potential-setting electrode piece 863 is formed directly on the surface of the substrate 61 where there is no groove, and the two potential-setting electrode pieces 862 and 863 are connected by one or more connecting electrode piece 864 in a ladder-like manner. In the same way, the potential-setting electrode piece 852 is formed directly on the bottom of the groove 613, the potential-setting electrode piece 853 is formed directly on the surface of the substrate 61 where there is no groove, and the two potential-setting electrode pieces 852 and 853 are connected by one or more connecting electrode piece 854 in a ladder-like manner. Thus, electrodes with greater electrode area can be formed, thereby improving the stability of potential applied to the electrodes.

FIG. 17 is a cross-sectional view along line A-B in FIG. 16A. In this case, at the side of the substrate 61 toward A, the potential-setting electrode piece 862 formed directly on the bottom of the groove 611 and the potential-setting electrode piece 863 formed directly on the surface of the substrate 61 where there is no groove are integrally formed with the connecting electrode piece 864. On the other hand, at the side of the substrate 61 toward B, the potential-setting electrode piece 852 formed directly on the bottom of the groove 613 and the potential-setting electrode piece 853 formed directly on the surface of the substrate 61 where there is no groove are not connected here.

Thus, as with the fifth embodiment, according to the present embodiment, the substrate 61 is a Z-cut substrate, so electric field can be effectively applied to the optical waveguides 123 and 124 by providing the over-waveguide electrode pieces 851 and 852 of the bias electrodes 85 and 86 directly above the optical waveguides 123 and 124 with the buffer layer 77 introduced there between. Also, grooves 611, 612, and 613 are formed on the substrate 61, with the potential-setting electrode pieces 852 and 862 being formed on the bottom of respective grooves 613 and 611 and the potential-setting electrode pieces 853 and 863 being formed on the surface of the substrate 61 where no groove is formed, and the potential-setting electrode pieces 852 and 862, and the potential-setting electrode pieces 853 and 863, being connected by respective connecting electrode pieces 854 and 864. Accordingly, larger electrodes can be configured, so each of the electric line of force as to the optical waveguide 123 generated due to the potential difference applied between the over-waveguide electrode piece 851 and the potential-setting electrode pieces 862, 863, and 864, and the electric line of force as to the optical waveguide 124 generated due to the potential difference applied between the over-waveguide electrode piece 861 and the potential-setting electrode pieces 852, 853, and 854, is more concentrated, and also more stable. Thus, voltage reduction of the power source 19 can be realized.

Tenth Embodiment

Figure 19:
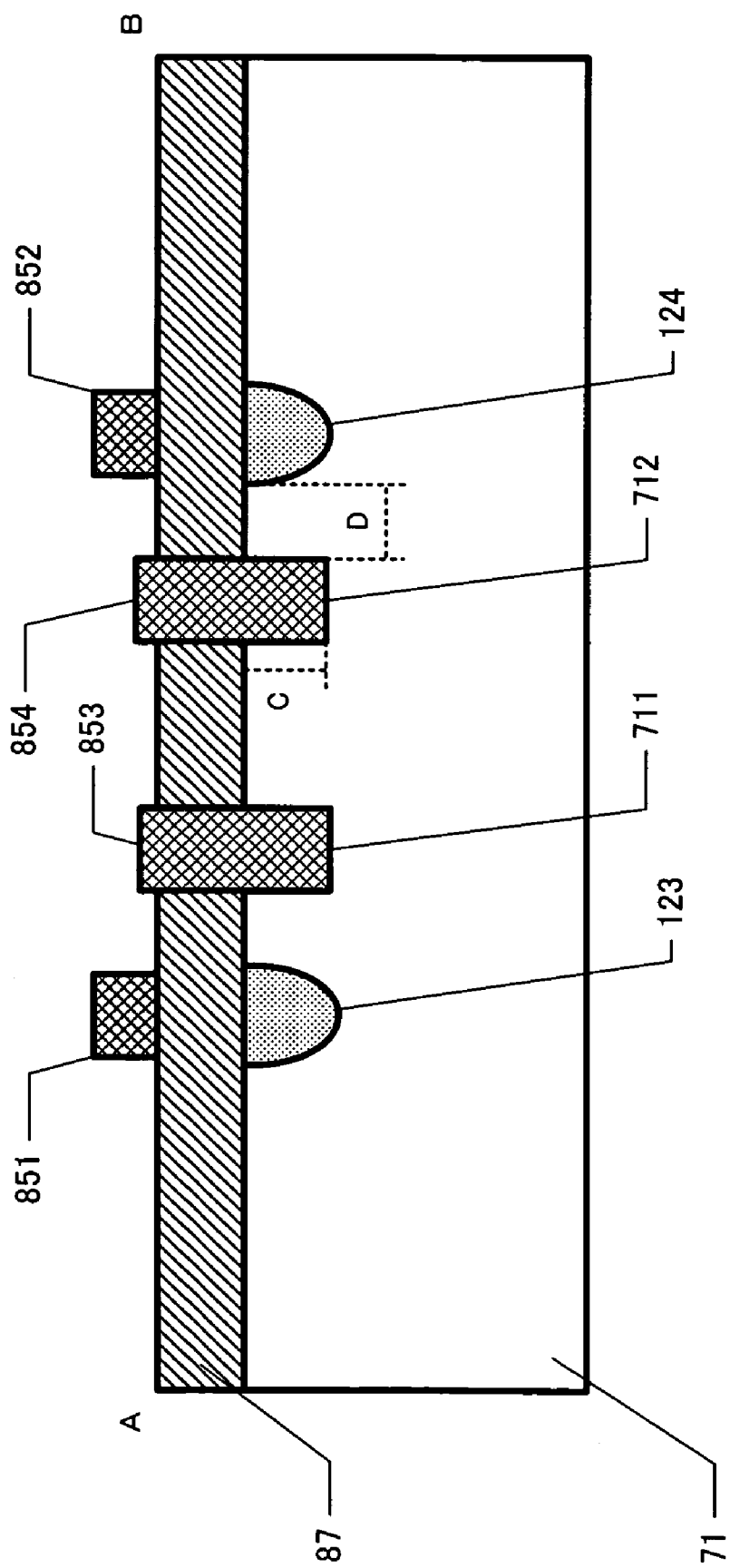
FIG. 19 is a cross-sectional view of a bias electrode region of the optical modulator shown in FIGS. 18A and 18B.

FIGS. 18A and 18B are diagrams for describing a tenth embodiment of the optical modulator according to the present invention. FIG. 19 is a cross-sectional view of the bias electrode region of the optical modulator shown in FIGS. 18A and 18B.

The optical modulator shown in FIGS. 18A, 18B, and 19 differs from the optical modulator according to the first embodiment in that a pair of first bias electrodes 851 and 852, and a pair of second bias electrodes 853 and 854 are provided. A power source 291 for controlling the operating point of the modulation signals generated by the RF signal source 18 is connected to the bias electrodes 851 and 852, and a power source 292 for controlling the operating point of the modulation signals generated by the RF signal source 18 is connected to the bias electrodes 853 and 854. FIG. 18B shows just the buffer layer 87 formed on the substrate 71 shown in FIG. 18A.

As shown in FIGS. 18A and 18B for example, the bias electrodes 851 and 853 are formed over the respective linear optical waveguides 123 and 124 with the buffer layer 87 introduced there between. The bias electrodes 852 and 854 are formed nearby the linear optical waveguides 123 and 124 with no buffer layer 87.

As shown in FIG. 19, for example, the Z-cut substrate 71 has grooves 711 and 712 formed nearby the linear optical waveguides 123 and 124, respectively. The bias electrodes 853 and 854 are formed in the grooves 711 and 712 without the buffer layer 87 introduced there between.

Accordingly, with the present embodiment, the substrate 71 is a Z-cut substrate, so electric field can be effectively applied to the optical waveguides 123 and 124 with no reduction in electric field due to the buffer layer, by providing the bias electrodes 851 and 853 directly above the optical waveguides 123 and 124 with the buffer layer 87 introduced there between, and the bias electrodes 852 and 854 provided in the grooves 711 and 712 respectively, with no buffer layer 87 introduced there between. The electric field applied to the optical waveguides 123 and 124 is created by the power source 291 of the first bias electrodes 851 and 852, and the power source 292 of the second bias electrodes 853 and 854, so the power source for creating a desired electrical field can be divided into two power sources, thereby realizing lower voltage at the power source, and reduction in size.

FIG. 20 is a cross-sectional view of the bias electrode region of the optical modulator shown in FIGS. 18A and 18B. This configuration is different from that shown in FIG. 19 in that the bias electrodes 853 and 854 are formed on the buffer layer 87, at a portion where a part of the buffer layer 87 has been removed.

With the optical modulator shown in FIG. 20, the advantages of reduction in voltage an reduction in size is small for the power sources 291 and 292 connected to the bias electrodes of the optical modulator shown in FIG. 19 are small, but in the event that the properties of the power sources 291 and 292 match optimal conditions for intensity of the electric field applied to the linear optical waveguides 123 and 124, according to the optical modulation properties, reduction of voltage and the power sources can be realized even with this arrangement wherein a part of the buffer layer has been removed.

Now, in the above-described fourth through sixth and eighth through tenth embodiments, the power of the light propagated over the optical waveguides peaks at a position 2 to 3 μm from the surface of the substrate (the surface of the optical waveguide). Accordingly, the depth of the grooves described in these embodiments (e.g., C in FIGS. 9, 10, 11, 15, 17, and 19) should be 3 μm or more to increase the advantages of reduced bias voltage.

Also, in the above-described fourth through sixth and eighth through tenth embodiments, the smaller the distance from the groove to the optical waveguide, the more concentrated the lines of electric force as to the optical waveguide are, so reduction in voltage of the bias power source (power source 19) can be realized. However in the event that the distance is too small, loss of light due to scattering is increased due to coarseness at the side face of the grooves. Thus, taking into consideration both reduction of bias voltage and loss of light propagated over the optical waveguide, the distance from the edge of the optical waveguide to the edge of the groove (e.g., D in FIGS. 9, 10, 11, 15, 17, 19, and 20) is preferably 0.5 to 4 μm.

Also, in the above-described sixth embodiment, a buffer layer is formed on the side face of the groove in order to reduce loss of light due to scattering from coarseness at the side face of the grooves. A material which is optically transparent and which has a lower refractive index than the substrate needs to be selected for the buffer layer. Also, another prerequisite is that the material be stable with regard to external environments such as temperature, humidity, and so forth, and that long-term reliability is high. From such conditions, silicon dioxide ($SiO_2$) is preferably used. The thickness of the buffer should be thicker than the thickness of that normally formed on the surface of the electrodes and substrate, preferably around 0.4 to 1.5 μm.

Also, while lithium neonate ($LiNbO_3$) has been illustrated above as a material having electro-optical effect, other materials used include semiconductors such as gallium arsenic (GaAs), indium phosphate (InP), and silicon (Si); dielectric materials such as lithium tantalite ($LiTaO_3$), strontium barium neonate (SBN), and potassium tantalite neonate (KTN); polymer materials such as poly methyl methacrylate (PMMA), DAST crystal which is an organic ionic salt; and so forth.

What is claimed is:

1. An optical modulator, comprising:
   a substrate having an electro-optical effect and a pair of interference-type optical waveguides formed therein;
   a signal electrode, formed on a buffer layer of the substrate above one of the pair of optical waveguides, applying a modulation signal for modulation of light propagated along the one of the pair of optical waveguides, and
   first and second bias electrodes each having a first electrode-piece formed on the buffer layer above one of the optical waveguides, and at least one second electrode-piece formed directly on the substrate adjacent to the other optical waveguide, for applying a bias signal controlling an operation point of the modulation.

2. An optical modulator, comprising:
   a substrate having an electro-optical effect, a pair of interference-tine optical waveguides formed therein, and a polarization inverting area formed partly in the substrate, forming one of the pair of optical waveguides therein;
   a signal electrode, formed on a buffer layer of the substrate above one of the pair of optical waveguides, applying a modulation signal for modulation of light propagated along the one of the pair of optical waveguides;
   a first bias electrode having first electrode-pieces formed on the buffer layer above the optical waveguides; and
   a second bias electrode having second electrode-pieces formed directly on the substrate adjacent to the first electrode-pieces, and having a third electrode-piece formed directly on the substrate on a boundary of the polarization inverting area and a polarization non-inverting area.

3. An optical modulator according to claim 1, further comprising on the substrate:
   a groove formed in a region where the plurality of potential-setting electrode pieces are provided;
   wherein each potential-setting electrode piece is provided at the bottom of the respective.

4. An optical modulator according to claim 3, wherein the thickness of the buffer layer is 0.4 to 1.5 μm.

5. An optical modulator according to claim 3, wherein each of the plurality of potential-setting electrode pieces is provided in a respective directly groove;
   wherein the potential-setting electrode pieces are provided on the bottoms of the respective grooves.

6. An optical modulator according to claim 3, wherein the depth of the groove is 3 μm or greater.

7. An optical modulator according to claim 3, wherein the distance between the edge of the groove and the edge of the optical waveguide is 0.5 to 4.0 μm.

8. An optical modulator according to claim 1, wherein substrate is a Z-cut substrate.

9. An optical modulator according to claim 1, wherein the substrate is a lithium neonate ($LiNbO_3$) substrate.

10. An optical modulator according to claim 2, wherein the second electric potential is a ground potential.

11. A Mach-Zehnder type optical modulator, comprising;
first and second bias electrodes provided each as a pair of bias electrodes, having one of the pair of bias electrodes formed above a pair of optical waveguides with a buffer layer formed between the bias electrodes and the optical wavegiuides, and having the other of the pair of bias electrodes formed adjacently to the one of the pair of bias electrodes so as to approach the optical waveguide through the buffer layer;

wherein an electric field provided by the second bias electrode is different from an electric field provide by the first bias electrode.

12. An optical modulator according to claim 1, wherein the buffer layer is formed on the substrate.

13. An optical modulator according to claim 1, wherein the buffer layer is formed between the electrodes and the substrate.

* * * * *

UNITED STATES PATENT AND TRADEMARK OFFICE
CERTIFICATE OF CORRECTION

PATENT NO. : 7,447,389 B2  Page 1 of 1
APPLICATION NO. : 11/653227
DATED : November 4, 2008
INVENTOR(S) : Masaki Sugiyama It is certified that error appears in the above-identified patent and that said Letters Patent is hereby corrected as shown below:

Column 16, Lines 29-30, change "interference-tine" to --interference-type--.

Column 16, Line 51, change "respective" to --respective groove.--.

Column 16, Line 56, delete the word "directly".

Column 16, Line 67, change "neonate" to --niobate--.

Column 17, Line 3, change "comprising;" to --comprising--.

Column 17, Line 8, change "wavegiuides," to --waveguides,--.

Column 18, Line 2, change "provide" to --provided--.

Signed and Sealed this

Eighth Day of June, 2010

David J. Kappos
*Director of the United States Patent and Trademark Office*